United States Patent
Roessel et al.

(10) Patent No.: US 11,165,495 B2
(45) Date of Patent: *Nov. 2, 2021

(54) TIME GRID WITH TIME DIVISION DUPLEX SWITCHING INTERVALS

(71) Applicant: Apple Inc., Cupertino, CA (US)

(72) Inventors: Sabine Roessel, Munich (DE); Holger Neuhaus, Munich (DE); Yeong-Sun Hwang, Oberhaching (DE); Bertram Gunzelmann, Neubiberg (DE); Andreas Menkhoff, Oberhaching (DE); Elmar Wagner, Neubiberg (DE); Jong-Kae Fwu, Sunnyvale, CA (US); Xiangyang Zhuang, Lake Zurich, IL (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/792,147

(22) Filed: Feb. 14, 2020

(65) Prior Publication Data
US 2020/0259561 A1    Aug. 13, 2020

Related U.S. Application Data

(63) Continuation of application No. 15/759,745, filed as application No. PCT/US2016/025630 on Apr. 1, 2016, now Pat. No. 10,567,074.
(Continued)

(51) Int. Cl.
*H04B 7/26* (2006.01)
*H04L 5/14* (2006.01)
(Continued)

(52) U.S. Cl.
CPC ......... *H04B 7/2656* (2013.01); *H04L 5/0007* (2013.01); *H04L 5/1469* (2013.01);
(Continued)

(58) Field of Classification Search
CPC ... H04B 7/2656; H04L 5/0007; H04L 5/1469; H04L 27/2607; H04L 27/263;
(Continued)

(56) References Cited

U.S. PATENT DOCUMENTS

| 8,989,762 B1 * | 3/2015 | Negus ............... H04B 7/0617 455/454 |
| 10,567,074 B2 | 2/2020 | Roessel et al. |

(Continued)

FOREIGN PATENT DOCUMENTS

| EP | 1995891 | 11/2008 |
| WO | WO 2010079940 | 7/2010 |

(Continued)

OTHER PUBLICATIONS

3GPP "Technical Specification Group Radio Access Network; Evolved Universal Terrestrial Radio Access (E-UTRA); Multiplexing and channel coding (Release 13)," 3GPP TS 36.212 V13.0.0 (Dec. 2015), 121 pages.
(Continued)

*Primary Examiner* — Candal Elpenord
(74) *Attorney, Agent, or Firm* — Fish & Richardson P.C.

(57) ABSTRACT

Methods and apparatus for communicating in a wireless network including apparatus comprising transceiver circuitry to send and receive data in a plurality of time periods, defined by a time division duplex (TDD) time grid, to another entity, the plurality of time periods corresponding to a plurality of orthogonal frequency division multiplexing (OFDM) symbols and the transceiver circuitry being operable to switch from receive mode to transmit mode and/or from transmit mode to receive mode according to a flexible uplink and downlink allocation of the plurality of time periods; and baseband circuitry coupled to the transceiver circuitry to control the transceiver circuitry to switch during
(Continued)

a switching interval embedded within a time period corresponding to an OFDM symbol of the plurality of OFDM symbols.

20 Claims, 10 Drawing Sheets

Related U.S. Application Data

(60) Provisional application No. 62/242,958, filed on Oct. 16, 2015, provisional application No. 62/254,614, filed on Nov. 12, 2015.

(51) Int. Cl.
*H04L 27/26* (2006.01)
*H04L 5/00* (2006.01)
*H04W 72/04* (2009.01)

(52) U.S. Cl.
CPC ........ *H04L 27/263* (2013.01); *H04L 27/2607* (2013.01); *H04W 72/0446* (2013.01); *H04L 27/2601* (2013.01)

(58) Field of Classification Search
CPC .......... H04L 27/2601; H04W 72/0446; H04W 72/04; H04W 72/02
See application file for complete search history.

(56) References Cited

U.S. PATENT DOCUMENTS

| | | | |
|---|---|---|---|
| 2004/0151109 A1* | 8/2004 | Batra | H04L 1/0071 370/208 |
| 2009/0141697 A1 | 6/2009 | Hofmann | |
| 2009/0185476 A1 | 7/2009 | Tsai et al. | |
| 2010/0195754 A1 | 8/2010 | Li et al. | |
| 2013/0286933 A1 | 10/2013 | Lee et al. | |
| 2016/0211955 A1* | 7/2016 | Wu | H04W 72/0426 |
| 2017/0034799 A1* | 2/2017 | Kim | H04W 56/003 |
| 2017/0373890 A1* | 12/2017 | Fertonani | H04L 27/0002 |
| 2018/0254851 A1 | 9/2018 | Roessel et al. | |
| 2019/0052354 A1 | 2/2019 | Roessel et al. | |

FOREIGN PATENT DOCUMENTS

| | | |
|---|---|---|
| WO | WO 2017065829 | 4/2017 |
| WO | WO 2017065830 | 4/2017 |

OTHER PUBLICATIONS

3GPP "Technical Specification Group Radio Access Network; Evolved Universal Terrestrial Radio Access (E-UTRA); Physical layer procedures (Release 13)," 3GPP TS 36.213 V13.0.1 (Jan. 2016 ), 326 pages.
3GPP, "Technical Specification Group Radio Access Network; Evolved Universal Terrestrial Radio Access (E-UTRA); Multiplexing and channel coding (Release 12)," 3GPP TS 36.212 V12.6.0 (Sep. 2015), 95 pages.
3GPP, "Technical Specification Group Radio Access Network; Evolved Universal Terrestrial Radio Access (E-UTRA); Physical channels and modulation (Release 12)," 3GPP TS 36.211 V12.7.0 (Sep. 2015), 136 pages.
3GPP, "Technical Specification Group Radio Access Network; Evolved Universal Terrestrial Radio Access (E-UTRA); Physical channels and modulation (Release 13)," 3GPP TS 36.211 V13.0.0 (Dec. 2015), 141 pages.
3GPP, "Technical Specification Group Radio Access Network; Evolved Universal Terrestrial Radio Access (E-UTRA); Physical layer procedures (Release 12)," 3GPP TS 36.213 V12.7.0 (Sep. 2015), 241 pages.
3GPP, "Technical Specification Group Radio Access Network; Evolved Universal Terrestrial Radio Access (E-UTRA); Radio Resource Control (RRC); Protocol specification (Release 12)," 3GPP TS 36.331 V12.7.0 (Sep. 2015), 453 pages.
3GPP, "Technical Specification Group Radio Access Network; Evolved Universal Terrestrial Radio Access (E-UTRA); Radio Resource Control (RRC); Protocol specification (Release 13)," 3GPP TS 36.331 V13.0.0 (Dec. 2015), 507 pages.
Hanzo et al., "Chapter 2: Introduction to Orthogonal Frequency Division Multiplexing," 2006 John Wiley & Sons, Ltd.; ISBN: 978 0 470 03007 3, Jan. 1, 2007, 19 pages.
Lahetkangas et al., "On the Selection of Guard Period and Cyclic Prefix for Beyond 4G TDD Radio Access Network," ISBN 978-3-8007-3498-6, The 19th European Wireless Conference, Apr. 16-18, 2013, Guildford, UK, 5 pages.
Nokia, "Nokia Vision & Priorities for Next Generation Radio Technology," 3GPP RAN workshop on 5G, RWS-150010, Sep. 17-18, 2015, Phoenix, AZ, USA, 17 pages.
PCT International Preliminary Report on Patentability in International Appln. No. PCT/US2016/025630, dated Apr. 17, 2018, 9 pages.
PCT International Search Report and Written Opinion in International Appln. No. PCT/US2016/025630, dated Jul. 18, 2016, 15 pages.

* cited by examiner

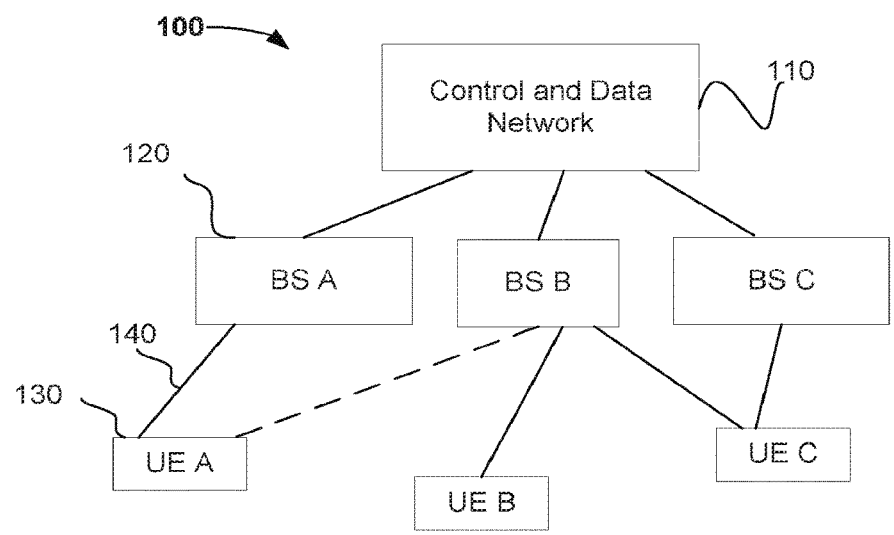
Fig. 1
Fig. 2
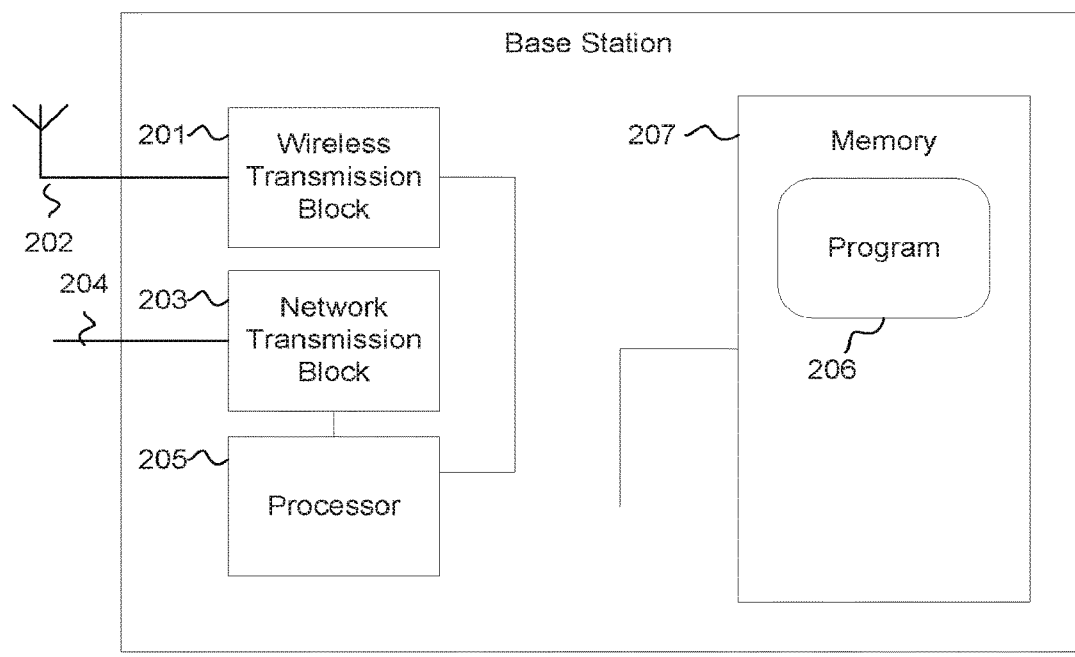

Fig. 8
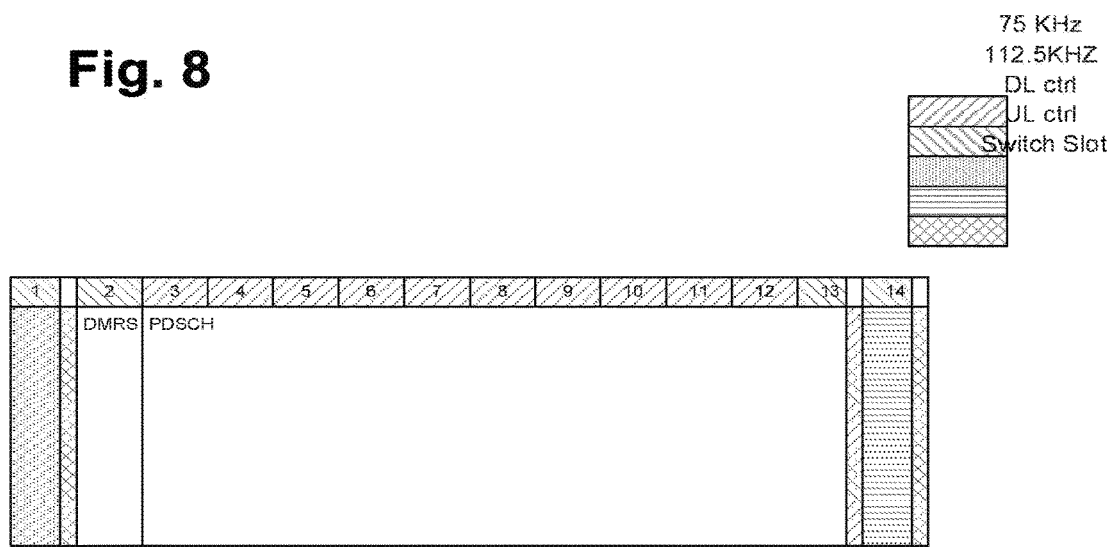
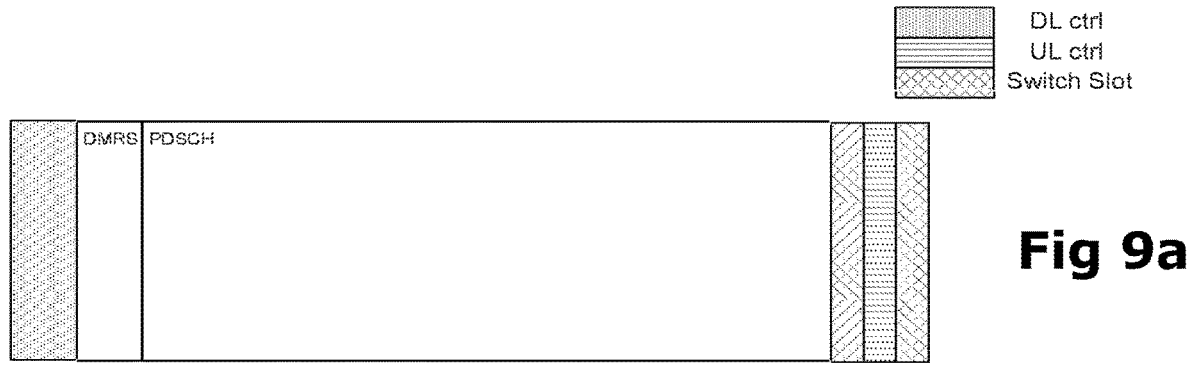
Fig 9a
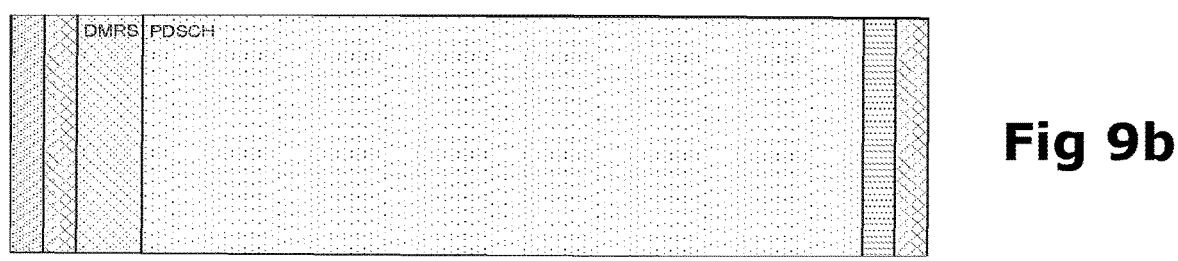
Fig 9b

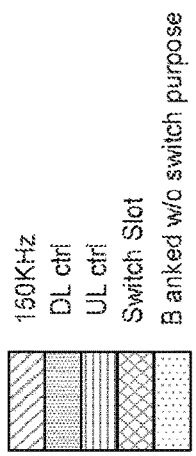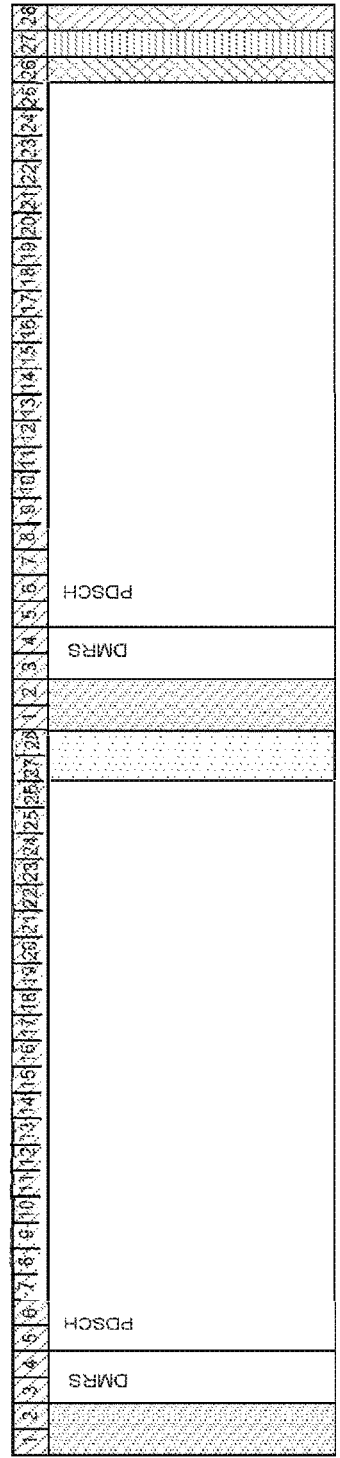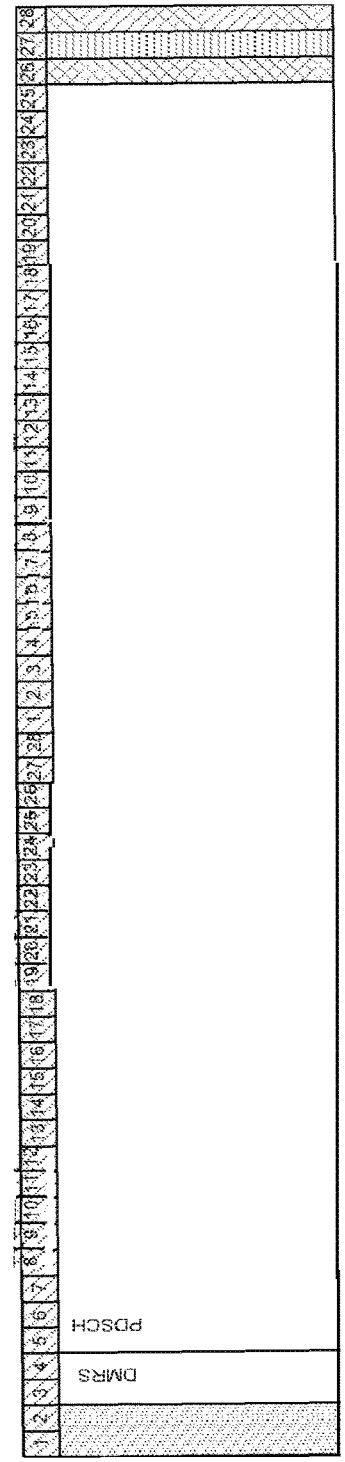
Fig 10a
Fig 10b

TIME GRID WITH TIME DIVISION DUPLEX SWITCHING INTERVALS

CROSS REFERENCE TO RELATED APPLICATIONS

The present application is a continuation of and claims priority to U.S. patent application Ser. No. 15/759,745, filed Mar. 13, 2018, which is a national phase entry under 35 U.S.C. 371 of International Application No. PCT/US2016/025630, filed Apr. 1, 2016, entitled "TIME GRID WITH TIME DIVISION DUPLEX SWITCHING INTERVALS," which claims priority to U.S. Provisional Patent Application No. 62/254,614, filed Nov. 12, 2015, entitled "REGULAR FIFTH GENERATION ORTHOGONAL FREQUENCY DEMODULATION TIME GRID WITH EMBEDDED TIME DIVISION DUPLEX SWITCHING INTERVALS", and U.S. Provisional Patent Application No. 62/242,958, filed Oct. 16, 2015, entitled "FLEXIBLE UNIVERSAL 5G FRAME STRUCTURE," the entire disclosures of each of which are whereby incorporated by reference in their entireties.

TECHNICAL FIELD

Embodiments described herein generally relate to wireless communications.

BACKGROUND

Some networks use time division duplexing to allow two communicating entities to send and respond to messages using the same frequency band. For example in a wireless communication network implementing a $3^{rd}$ Generation Partnership Project (3GPP) long-term evolution (LTE) or long-term evolution-advanced (LTE-A) communications standard, some time periods in a time division duplex (TDD) time grid may be allocated to the downlink signaling from a base station to a user equipment (UE) and other time periods may be allocated to uplink signaling from the UE to the base station. Switching intervals for allowing the transceiver circuitry of the communicating entities to switch from transmit (TX) mode to receive (RX) mode and from RX mode to TX mode are included in the time grid. It has been proposed that a future 3GPP fifth generation (5G) wireless communication network may also use TDD.

In legacy LTE networks, communication takes places over a number of time frames and each frame is divided into a plurality of subframes. In legacy LTE, the user equipment and the base station agree to use one out of a small number of subframe configurations. Each subframe configuration defines a different allocation of subframes to uplink and downlink communication. Switching takes place in special subframes at agreed locations within the frames. The special subframe includes downlink and uplink signals with a guard period embedded in between. Switching is assumed to take place in this guard period.

BRIEF DESCRIPTION OF THE DRAWINGS

Embodiments described herein are illustrated, without limitation, by way of example, in the accompanying drawings, in which:

FIG. 1 is schematic block diagram of a wireless communications network;

FIG. 2 is schematic block diagram illustrating a base station in the network;

FIG. 8 illustrates another example of embedding switching intervals in a time grid for use in the network;

FIGS. 9a and 9b illustrate other examples of embedding switching intervals in a time grid for use in the network;

FIGS. 10a and 10b illustrate yet other examples of embedding switching intervals in a time grid for use in the network;

DETAILED DESCRIPTION OF EMBODIMENTS

Figure 3:
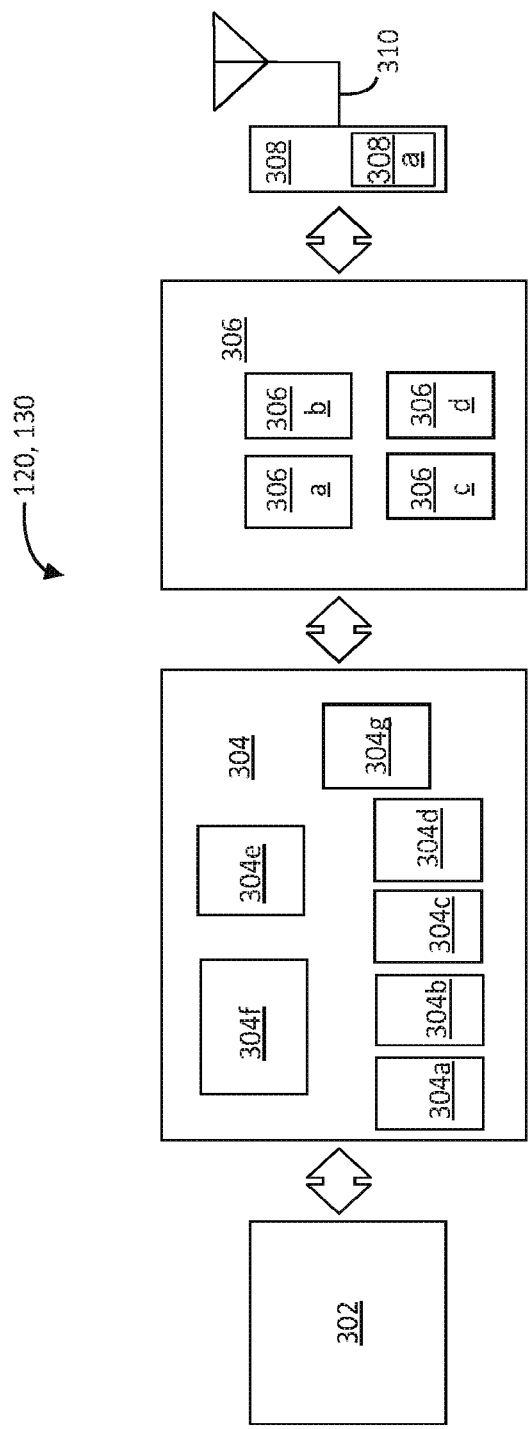
FIG. 3 is a schematic block diagram illustrating an electronic device in the network.

The following detailed description refers to the accompanying drawings. The same reference numbers may be used in different drawings to identify the same or similar elements. Numbers provided in flow charts and processes are provided for clarity in illustrating operations and do not necessarily indicate a particular order or sequence. In certain instances, descriptions of well-known devices, circuits, and methods are omitted so as not to obscure the description of the embodiments with unnecessary detail.

FIG. 1 schematically illustrates a wireless communication network 100. The wireless communication network 100 may provide an access network of a 3rd Generation Partnership Project (3GPP) next generation radio access network, such as a 3GPP beyond $4^{th}$ generation (B4G) and/or a 3GPP $5^{th}$ generation (5G) radio access network. It may additionally or alternatively provide an access network of a 3GPP long-term evolution (LTE) or long-term evolution-advanced (LTE-A) network such as an evolved universal mobile telecommunication system (UMTS) terrestrial radio access network (E-UTRAN). Hereinafter a 3GPP next generation or future radio access network will in places be referred to as a '5G' radio access network and components, protocols or time grids associated with that network will be referred to as '5G' components, protocols or time grids. However, it will be appreciated that this is just a label used herein, the next generation network may be given a different name in the future and the components, protocols or time grid described herein may be used in the next generation future network irrespective of the name of that network.

The communication network comprises a control and data network 110, a plurality of base stations 120 and a plurality of user equipment (UE) 130. The control and data network 110 may comprise an LTE evolved packet core (EPC). Additionally or alternatively it may comprise a 5G core. It may also comprise an operator packet data network. The base stations 120 may be fixed or mobile stations/modes. In FIG. 1, three base stations 120, BS A, BS B and BS C, are shown. The plurality of UEs may comprise one or more mobile devices or terminals. In FIG. 1, three UEs 130, UE A, UE B and UE C, are shown. The base stations are configured to wirelessly communicate with the UEs using signals 140. The network 100 provides radio service coverage over a number of cells formed by the base stations. A UE, within a cell, connects to an associated base station and receives and transmits data, including voice data, from and to the network via the base station to which it is connected. Some or all of the base stations may comprise evolved node base stations (eNodeBs or eNB).

During operation of the wireless network 100, a UE 130 may move through the area covered by the network. For example, when the UE A is within the cell area associated with BS A, the UE A will transmit and receive signals 140 to and from the network via that BS A. Subsequently, the UE A may move to a different position outside of the cell area associated with BS A, but within the area covered by BS B. As the UE A moves from the first position to the second position, a handover procedure will be initiated such that the UE's connection to the wireless network 100 is via signals (shown with a dashed line) transmitted and received to and from the BS B. Two or more of the base stations may cover overlapping cell areas such that a UE in the cell area can communicate with two or more base stations. For example, UE C may be able to communicate with both BS B and BS C. The base station that a UE is connected to is referred to as the serving base station for that UE.

Parts of the network 100 may be used by a plurality of wireless network operators. Some of the infrastructure provided by the network may be used by only one operator and some of the infrastructure, for example some of the base stations, may be shared by operators. Each operator controls its own public land mobile network (PLMN) which may or may not share radio access network (RAN) infrastructure with another PLMN. Each UE has a home PLMN (HPLMN), which is the PLMN in which the user's subscriber profile is held. However, when the UE is outside the coverage of the HPLMN, the UE may connect to a PLMN provided by another operator. This is known as roaming. For example, if the HPLMN of UE B does not have access to BS A and BS C, UE B may be configured to roam if it moves away from the cell area covered by BS B into a cell area covered by BS A or BS C.

The EPC may comprise a mobility management entity (MME), a serving gateway (S-GW), a packet data network gateway (P-GW) and a home subscriber server (HSS). The components of an EPC will be known by the skilled person and will not be described herein. The EPC may be connected to external networks including but not limited to an IP multimedia core network subsystem (IMS) and the internet. The 5G core may comprise corresponding components. It may also include additional or fewer components.

The UEs and the base station receive (RX) and transmit (TX) data within a number of frequency bands. In future 5G deployments, they may communicate in one or more frequency bands from sub 6 GHz to 30 GHz. The base stations transmit data in the downlink (DL) to the UEs and the UEs transmit data in the uplink (UL) to the base stations. When the network is in time division duplex (TDD) mode, the uplink and the downlink are provided in the same frequency band but the uplink transmissions occur in different time periods to the downlink transmissions. It will be appreciated that the network may also be able to support frequency division duplex (FDD) mode. Alternatively, it may only use TDD mode.

The network uses orthogonal frequency division multiplex (OFDM) access schemes. It may use OFDM in both the uplink and the downlink. In some implementations, for example in implementations in which the network supports LTE communication standards, the network may support orthogonal frequency division multiplex access (OFDMA) for the downlink and single carrier frequency division multiple access SC-FDMA for the uplink. OFDMA and SC-FDMA are both forms of OFDM. OFDM modulation allows data to be carried as multiple orthogonal sub-carrier signals over multiple narrow and closely spaced frequency channels. Each sub-carrier signal may be modulated using an appropriate modulation scheme.

Further information about modulation, multiplexing and procedures that could be used for implementing the networks and communication according to some embodiments described herein can be found in for example, but not limited to, 3GPP technical specification TS 36.211 V12.7.0 (2015-09) and V13.0.0 (2015-12), technical specification TS 36.212 V12.6.0 (2015-09) and V13.0.0 (2015-12), technical specification TS 36.213 V12.7.0 (2015-09) and V13.0.1 (2016-01), and/or technical specification TS 36.331 V12.7.0 (2015-09) and V13.0.0 (2015-12).

When OFDM is used, data is transmitted as a number of OFDM symbols. Each symbol is transmitted over a certain time period or time duration allocated for transmitting the OFDM symbol. At the receiving side, the OFDM symbols are received in time periods allocated for receiving the OFDM symbols. If the UE has been transmitting data over a number time periods corresponding to OFDM symbols to the base station, the UE will switch from TX mode to RX mode to be able to receive data from the base station in a next OFDM symbol. Similarly, the base station will switch from RX mode to TX mode to be able to start transmitting the data to the UE. Conversely, if the UE has been in RX mode listening to signals from the base station over a number of OFDM symbols, the UE will switch to TX mode and the base station will change to RX mode for the UE to be able to respond to the base station in later time periods corresponding to OFDM symbols.

The base stations 120 and the UEs 130 may be manufactured and the overall network 100 may be organized such that The TX to RX (and RX to TX) switching times may be minimized in order to enable for a best possible spectral efficiency.

The TX to RX (and RX to TX) switching times may allow for supporting sub 6 GHz up to 30 GHz cmWave deployments with the same numerology and frame structure.

A minimum TDD switching time interval $T_{switch}$ may comprise four major elements—channel delay spread, propagation delay, filter response time to delay spread, and hardware (HW) TDD switching interval. The channel delay spread $T^T{}_{ds}$ may be typically represented by root-mean-square (rms) delay spread metric. In 5G small-cell applications, the delay spread may be expected to be smaller than in the current macro-cell applications, and may be in the range of 100 nsec. The propagation delay $T_{pd}$ may also depend on the expected cell size. An example cell radius of 100m may amount to a propagation delay of about 333 nsec. The filter response time $T_{filter}$ for small delay spread may be estimated to be around 50 nsec.

The total HW TDD switching interval $T_{HW}$ may consist of multiple contributions. Assuming the TX to RX transition, first the TX may be ramped down and switched off, then the antenna switch may be turned to the RX, the radio frequency (RF) parts of the RX (low noise amplifier (LNA), mixer, oscillator path etc.) may be activated and finally the signal may pass through the receiver. In case of the RX to TX transition it may be similar, but the sequence may be reversed with some modifications. First the RX may be ramped down in a controlled manner with a certain time constant in order to limit the emissions due to switching transients. It is expected that to fulfil a reasonable suppression of emissions into the adjacent channel due to the switching transients a ramping time of approximately 5 times 1/bandwidth (BW) may be desired, therefore for a 10 MHz wide signal approximately 500 ns may be desired, while for a 100 MHz wide signal 50 ns may be desired for ramping. The next block may be to shut down the transmitter. Since there are some blocking capacitors on the supply rails this may cost another approximately 500 ns until it may be safe to open the output connection with the antenna switch, which itself may be estimated to be 100 ns to switch from TX to RX. The receiver frontend can then be switched on as well, however, the direct current (DC) voltages may settle before a useful reception is possible. Since a RX may be very sensitive on DC offsets which are generated in the RF and baseband part of the receiver, it may take an estimated 1.51 µs to get this stable. So in total the TX-RX switching time may amount to approximately 2 µs. The RX-TX switching time may be expected to be similar.

Thus, the overall minimum TDD switching interval $T_{switch}$ may be modelled as:

$$T_{switch} = T_{ds} + T_{pd} + T_{filter} + T_{HW}$$

which for 5G small-cell applications with current generation of RF devices may be estimated as follows (for shared TX and RX RF chains):

$$T_{switch} \approx 100 + 333 + 50 + 2000 = 2483 \text{ nsec}$$

The UEs and the access network may use a flexible 5G TDD frame structure. According to embodiments, the TDD frame structure provides an OFDM time grid with TDD switching intervals embedded within the time periods allocated for transmitting or receiving OFDM symbols. Measures can be taken, in some implementations and examples, not to compromise the data communication or to limit the level to which the communication is compromised or corrupted.

In some implementations of next generation or 5G wireless communication networks, the time periods corresponding to OFDM symbols of each subframe may flexibly and at least semi-dynamically be used for the uplink or downlink as needed. The allocation of time periods to the uplink and downlink may be negotiated and agreed between the communicating entities. Consequently, the allocation is not limited to a small number of pre-configured or predetermined allocation configurations. The TDD frame structure with embedded switching time intervals described herein may provide a perfectly or almost perfectly regular 5G OFDM time grid.

It will be appreciated that if a flexible allocation of OFDM symbols to the uplink and downlink are used, different UEs may communicate with a different UL/DL ratio depending on the needs of the UEs at that particular time. In at least some situations, if two nearby UEs are in receive mode and transmit mode respectively, the UL transmission of one UE could severely disturb the DL reception of the other. Consequently, it may be desirable to align the direction of communication of nearby UEs. It may also be desirable to ensure that data communication symbols do not overlap with reference signal symbols. It has been proposed that switching intervals for switching from TX to RX or vice versa may be added between the OFDM symbols. However, this may result in misalignment between the grids of nearby UEs. For example, if the starting times of OFDM symbol in the time grid used by a first UE slightly deviates from starting times of OFDM symbol of the time grid used by the second UE due to added switching intervals between the symbols, a DL symbol of the first UE may overlap with a UL symbol of the second UE. By embedding switching within the time periods corresponding to individual OFDM symbols, a flexible time grid may be provided wherein the starting time of OFDM symbols are shared by all devices communicating in the system while still allowing flexible allocation of symbols to the downlink and to the uplink.

In some embodiments, the OFDM time grid may be a 'perfect' or an 'almost perfect' regular 5G OFDM time grid in the sense that the grid define regular OFDM symbol starting times or OFDM symbol spacing times and a new OFDM symbol starts at each of the defined regular symbol spacing times. The majority of OFDM symbols start at one of the defined symbol spacing times or at regular intervals between two adjacent symbol spacing times. The regular symbol spacing times may be equidistant. The time interval between adjacent spacing times may be constant throughout a subframe. It may be constant throughout the time grid. Alternatively, in an almost perfectly regular grid, the time grid may also define one or more symbol spacing times shifted compared to the regular spacing times such that the time interval between the majority, but not all, adjacent OFDM symbol spacing times, is constant throughout the subframe. Each symbol spacing time still correspond to a start time of an OFDM symbol. The symbol spacing times may be shared by the devices in the network.

Each of the regular intervals between two adjacent spacing times mentioned above may be a fraction of the time duration between the adjacent spacing times. The grid may provide for a limited subset of predefined fractions defining symbol start times between the two adjacent spacing times. The time duration between two adjacent symbol spacing time is accordingly equal to the length of time duration of an OFDM symbol or equal to an integer multiple of the length or time duration of an OFDM symbol. It will be appreciated that here the length of an OFDM symbol may be considered to include the length of the associated cycling prefix. Consequently, the grid allow for the system to use different sampling frequencies such that, for example, a portion of a subframe may comprise faster symbols sampled at a higher sampling frequency than a sampling frequency used in other portions of the subframe or by other entities. In that case, the starting times of a subset of the fast OFDM symbols will still coincide with the symbol spacing times and therefore the start times of slower OFDM symbols in time grids used by nearby UEs and the different time grids used will not deviate. The spacing times are known by the UE and the base stations. Consequently, although for example base stations and UEs in different cells may switch at different times, the symbol spacing times are aligned and interference is reduced.

It will be appreciated that even if the UL/DL allocation can be dynamically changed, UEs communicating with the same receiver/transceiver of the base station must use the same allocation. However, the regular time grid would maintain alignment between UEs communicating with different receivers/transceivers or communication in different cells and using different UL and DL allocation ratios.

In some embodiments, the time grid may not be perfectly regular in the sense that the time period between for example the start time of the time period corresponding to the first symbol of a subframe and the start time of the time period corresponding to the second OFDM symbol of the subframe may be slightly longer than the time period between subsequent OFDM symbols start times. This 'almost' perfectly regular time grid may be provided to be compatible with LTE networks, such as for example LTE Advanced and LTE Advanced Pro, to ensure alignment between time grids used by electronic devices operating in a wireless communication network implementing both LTE and next generation wireless communication standards.

By providing such an (almost) perfect regular time grid one or more of the following advantages may be realized:
- Enable a flexible physical layer (Layer 1) channel design and use case-specific physical layer assembly
- Allow for coexistence, i.e. uplink (UL)-downlink (DL) conflict prevention
- Steer towards inter-cell reference symbol collision in order to avoid interferer reference symbol collisions with wanted data symbols and vice versa.
- Enable multi-site transmission, e.g. Coordinated Multi-Point (CoMP), under flexible TDD conditions.
- Enable nesting of 5G device to device (D2D) communication into 5G cellular communication The embedded TDD switching intervals may be realised by the receiving entity and/or the transmitting entity ignoring or blanking at least a fraction of time samples of an OFDM symbol while adopting appropriate measures to reliably receive and transmit any data to be received or transmitted in the OFDM symbols.

In some embodiments, the UE and the base station may agree to blank the entire OFDM symbol to use the time period associated with the OFDM symbol as a switching interval. The UE and the base station would then not exchange any data during the time period corresponding to the blanked OFDM symbol.

In other embodiments described herein, two sampling rates may be used within a single subframe or multiple subframes forming a self-contained subframe block (SFB). TDD switching intervals may be embedded within a fast sampled OFDM symbol. The UE and the base station may blank one or more of the fast sampled OFDM symbols in a single subframe or in selected positions of the SFB. In other words, the UE and the base station may decide not to exchange any data during the blanked fast sampled OFDM symbols. Instead, the UE and the base station may decide to exchange all the data scheduled for the slow OFDM symbol, had a slower sampling rate been used, in the remaining fast OFDM symbols within the time period corresponding to the slow OFDM symbol.

In yet other embodiments, the UE or the base station may just ignore or suppress a fraction of the time samples to be received or scheduled to be transmitted during the time period corresponding to an OFDM symbol and improve processing to limit signal quality degradation as a result of the ignored or suppressed data.

The arrangement and processes of the network 100, and specifically the base stations and the UEs, for embedding switching intervals in OFDM time grids will be described in more detail below. Firstly, the components of the base station and the UE will be described with respect to FIGS. 2 and 3.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

FIG. 2 illustrates for one embodiment, example components of a base station, for example, BS A, BS B and BS C in FIG. 1. The base station comprises a wireless transmission block 201 for communicating wirelessly with UEs such as, for example, UEs A, B and C described with respect to FIG. 1. The transmission block 201 has an associated antenna 202 and may have a number of antennas for multiple-input and multiple-output (MIMO) operation. Some of the circuitry of the transmission block 201 may be switched when the base station changes from TX to RX mode and from RX to TX mode. The circuitry may comprise a plurality of switches to combine a plurality of TX outputs and a plurality of RX inputs to the antenna 202. A network transmission block 203 may be provided, which supports network communications such as communication with the control and data network 110 and, for example, backhaul communications with other base stations such as BS B and BS C, or any other network entity. The base station can comprise, therefore, a network connection 204 such as, for example, the communication link with the control network 110 described above. A processor 205 is provided for controlling overall operations of the base station.

The processor 205 can comprise a number of processors, and/or one or more multi-core processors. The processor 205 operates in accordance with software 206 stored within a processor readable, or processor accessible, memory or storage 207. The software 206 is arranged so that the base station can implement the examples described herein, and, in particular, can implement the base station aspects of the flowcharts and flow diagrams described herein. The memory 207 may store data and software defining routines for implementing sensing, inter-cell interference coordination (ICIC), mobility, access control, radio resource management (RRM) and scheduler functions. The memory may store data and software for defining routines for implementing additional 5G functionality. The memory 207 may also comprise elements of a protocol stack such as, for example, physical (PHY), media access control (MAC), radio link control (RLC), packet data convergence protocol (PDCP), and/or radio resource control (RRC) elements. Some or all of the elements may form elements of an evolved universal terrestrial radio access network (E-UTRAN) protocol. Some or all of the mentioned elements, and/or other elements of the memory, may additionally or alternatively form elements of a 5G RAN protocol.

FIG. 3 illustrates, for one embodiment, example components of an electronic device. In embodiments, the electronic device may be, implement, be incorporated into, or otherwise be a part of a user equipment (UE) 130, an evolved NodeB (eNB) 120, a base station (BS) 120, some other appropriate device, and/or some combination thereof. In some embodiments, the electronic device 120, 130 may include application circuitry 302, baseband circuitry 304, radio frequency (RF) circuitry 306, front-end module (FEM) circuitry 308 and one or more antennas 310, coupled together at least as shown.

The application circuitry 302 may include one or more application processors. For example, the application circuitry 302 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 304 may include circuitry such as, but not limited to, one or more single-core or multi-core processors. The baseband circuitry 304 may include one or more baseband processors and/or control logic to process baseband signals received from a receive signal path of the RF circuitry 106 and to generate baseband signals for a transmit signal path of the RF circuitry 306. Baseband processing circuitry 304 may interface with the application circuitry 302 for generation and processing of the baseband signals and for controlling operations of the RF circuitry 306. For example, in some embodiments, the baseband circuitry 304 may include a second generation (2G) baseband processor 304*a*, third generation (3G) baseband processor 304*b*, fourth generation (4G) baseband processor 304*c*, and/or other baseband processor(s) 304*d* for other existing generations, generations in development or to be developed in the future (e.g., fifth generation (5G), 6G, etc.). The baseband circuitry 304 (e.g., one or more of baseband processors 104*a-d*) may handle various radio control functions that enable communication with one or more radio networks via the RF circuitry 306. The radio control functions may include, but are not limited to, signal modulation/demodulation, encoding/decoding, radio frequency shifting, etc. In some embodiments, modulation/demodulation circuitry of the baseband circuitry 304 may include OFDM modulation/demodulation functionality. The modulation/demodulation circuitry may also comprise Fast-Fourier Transform (FFT), precoding, and/or constellation mapping/demapping functionality. In some embodiments, encoding/decoding circuitry of the baseband circuitry 304 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 304 may include elements of a protocol stack such as, for example, physical (PHY), media access control (MAC), radio link control (RLC), packet data convergence protocol (PDCP), and/or radio resource control (RRC) elements. Some or all of the mentioned elements may for part of elements of an evolved universal terrestrial radio access network (EUTRAN) protocol. Some or all of the mentioned elements, and/or other elements of the baseband circuitry, may alternatively or additionally form part of a 5G protocol. A central processing unit (CPU) 304*e* of the baseband circuitry 304 may be configured to run elements of the protocol stack for signaling of the PHY, MAC, RLC, PDCP and/or RRC layers. In some embodiments, the baseband circuitry may include one or more audio digital signal processor(s) (DSP) 104*f*. The audio DSP(s) 304*f* may include elements for compression/decompression and echo cancellation and may include other suitable processing elements in other embodiments.

The baseband circuitry 304 may further include memory/storage 304*g*. The memory/storage 304*g* may be used to load and store data and/or instructions for operations performed by the processors of the baseband circuitry 304. Memory/storage for one embodiment may include any combination of suitable volatile memory and/or non-volatile memory. The memory/storage 304*g* may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 304*g* may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 304 and the application circuitry 302 may be implemented together such as, for example, on a system on a chip (SOC).

In some embodiments, the baseband circuitry 304 may provide for communication compatible with one or more radio technologies. For example, in some embodiments, the baseband circuitry 304 may support communication with a 5G radio access network, an evolved universal terrestrial radio access network (EUTRAN) and/or other wireless metropolitan area networks (WMAN), a wireless local area network (WLAN), a wireless personal area network (WPAN). Embodiments in which the baseband circuitry 304 is configured to support radio communications of more than one wireless protocol may be referred to as multi-mode baseband circuitry.

RF circuitry 306 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 306 may include a receive signal path which may include circuitry to down-convert RF signals received from the FEM circuitry 308 and provide baseband signals to the baseband circuitry 304. RF circuitry 06 may also include a transmit signal path which may include circuitry to up-convert baseband signals provided by the baseband circuitry 304 and provide RF output signals to the FEM circuitry 308 for transmission.

In some embodiments, the RF circuitry 306 may include a receive signal path and a transmit signal path. The receive signal path of the RF circuitry 306 may include mixer circuitry 306*a*, amplifier circuitry 306*b* and filter circuitry 306*c*. The transmit signal path of the RF circuitry 306 may include filter circuitry 306*c* and mixer circuitry 306*a*. RF circuitry 306 may also include synthesizer circuitry 306*d* for synthesizing a frequency for use by the mixer circuitry 306*a* of the receive signal path and the transmit signal path. In some embodiments, the mixer circuitry 306*a* of the receive signal path may be configured to down-convert RF signals received from the FEM circuitry 308 based on the synthesized frequency provided by synthesizer circuitry 306d. The amplifier circuitry 306b may be configured to amplify the down-converted signals and the filter circuitry 306c may be a low-pass filter (LPF) or band-pass filter (BPF) configured to remove unwanted signals from the down-converted signals to generate output baseband signals. Output baseband signals may be provided to the baseband circuitry 304 for further processing. In some embodiments, the output baseband signals may be zero-frequency baseband signals, although this is not a requirement. In some embodiments, mixer circuitry 306a of the receive signal path may comprise passive mixers, although the scope of the embodiments is not limited in this respect.

In some embodiments, the mixer circuitry 306a of the transmit signal path may be configured to up-convert input baseband signals based on the synthesized frequency provided by the synthesizer circuitry 306d to generate RF output signals for the FEM circuitry 308. The baseband signals may be provided by the baseband circuitry 304 and may be filtered by filter circuitry 306c. The filter circuitry 306c may include a low-pass filter (LPF), although the scope of the embodiments is not limited in this respect.

In some embodiments, the mixer circuitry 306a of the receive signal path and the mixer circuitry 306a of the transmit signal path may include two or more mixers and may be arranged for quadrature downconversion and/or upconversion respectively. In some embodiments, the mixer circuitry 306a of the receive signal path and the mixer circuitry 306a of the transmit signal path may include two or more mixers and may be arranged for image rejection (e.g., Hartley image rejection). In some embodiments, the mixer circuitry 306a of the receive signal path and the mixer circuitry 306a may be arranged for direct downconversion and/or direct upconversion, respectively. In some embodiments, the mixer circuitry 306a of the receive signal path and the mixer circuitry 306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 306 may include analog-to-digital converter (ADC) and digital-to-analog converter (DAC) circuitry and the baseband circuitry 304 may include a digital baseband interface to communicate with the RF circuitry 306.

In some dual-mode embodiments, a separate radio IC circuitry may be provided for processing signals for each spectrum, although the scope of the embodiments is not limited in this respect.

In some embodiments, the synthesizer circuitry 306d may be a fractional-N synthesizer or a fractional N/N+1 synthesizer, although the scope of the embodiments is not limited in this respect as other types of frequency synthesizers may be suitable. For example, synthesizer circuitry 306d may be a delta-sigma synthesizer, a frequency multiplier, or a synthesizer comprising a phase-locked loop with a frequency divider.

The synthesizer circuitry 306d may be configured to synthesize an output frequency for use by the mixer circuitry 306a of the RF circuitry 306 based on a frequency input and a divider control input. In some embodiments, the synthesizer circuitry 306d may be a fractional N/N+1 synthesizer.

In some embodiments, frequency input may be provided by a voltage controlled oscillator (VCO), although that is not a requirement. Divider control input may be provided by either the baseband circuitry 304 or the applications processor 302 depending on the desired output frequency. In some embodiments, a divider control input (e.g., N) may be determined from a look-up table based on a channel indicated by the applications processor 302.

Synthesizer circuitry 306d of the RF circuitry 306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 306 may include an IQ/polar converter.

FEM circuitry 308 may include a receive signal path which may include circuitry configured to operate on RF signals received from one or more antennas 310, amplify the received signals and provide the amplified versions of the received signals to the RF circuitry 306 for further processing. FEM circuitry 308 may also include a transmit signal path which may include circuitry configured to amplify signals for transmission provided by the RF circuitry 306 for transmission by one or more of the one or more antennas 310.

In some embodiments, the FEM circuitry 308 may include a TX/RX switch 308a to switch between transmit mode and receive mode operation. The switch 308a may comprise a plurality of switches to combine a plurality of TX outputs and a plurality of RX inputs to a plurality of antennas. The switches may comprise one or more logical and/or physical switches. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 306). The transmit signal path of the FEM circuitry 308 may include a power amplifier (PA) to amplify input RF signals (e.g., provided by RF circuitry 106), and one or more filters to generate RF signals for subsequent transmission (e.g., by one or more of the one or more antennas 310.

In some embodiments, the electronic device may include additional elements such as, for example, memory/storage, display, camera, sensor, and/or input/output (I/O) interface.

In some embodiments, the electronic device may be configured to perform one or more methods, processes, and/or techniques as described herein, or portions thereof. The UE and the software may implement the examples described herein, and, in particular, can implement the UE aspects of the flowcharts and flow diagrams described herein.

When the electronic device shown in FIG. 3 is a base station 120, the application circuitry, baseband circuitry, RF circuitry and FEM circuitry of FIG. 3 may implement at least parts of the wireless transmission block 201, the processor 205 and the memory 207 described with respect to FIG. 2.

In embodiments where the electronic device is, implements, is incorporated into, or is otherwise part of either a user equipment (UE) or a base station (BS), the electronic device 130 may include radio frequency (RF) circuitry 306 and baseband circuitry 304 coupled with the RF circuitry 306. The baseband circuitry 304 may be to cause the RF circuitry 306 to receive a subframe that includes at least one OFDM symbol. The baseband circuitry 304 may be further to overlook a first portion of time samples of the at least one OFDM symbol and perform appropriate measures with a second portion of the time samples that were not overlooked. The baseband circuitry 304 may control transceiver circuitry comprising some of the components of the circuitry described with respect to FIG. 3 to switch from TX to RX mode or from RX to TX mode during the time period corresponding to the first portion of time samples. For example, the transceiver circuitry may comprise, but is not limited to, components of the RF circuitry 306 and the FEM circuitry 308, such as for example the mixer circuitry 306a, oscillator, LNA and the TX/RX switch 308a. It may include fewer or additional components.

In embodiments where the electronic device is, implements, is incorporated into, or is otherwise part of either a user equipment (UE) or a base station (BS), the electronic device 130 may include radio frequency (RF) circuitry 306 and baseband circuitry 204 coupled with the RF circuitry 206. The baseband circuitry 304 may be to identify a subframe to be transmitted to a remote device and generate a new subframe from the subframe by suppression of a portion of time samples of an OFDM symbol within the subframe to be transmitted. The baseband circuitry 304 may further be to cause the RF circuitry to transmit the new subframe to the remote device. Again, the baseband circuitry 304 may control transceiver circuitry comprising some of the components of the RF circuitry and the FEM circuitry to switch from TX to RX mode or from RX to TX mode during the time period corresponding to the first portion of time samples.

The baseband circuitry 304 may be configured to ignore or suppress, and/or cause the RF circuitry to ignore or suppress, the fraction of time samples of an OFDM symbol within a subframe and embed within a time interval corresponding to the fraction of time samples the TDD switching interval. In transmit mode, higher layers may select data to be transmitted during the OFDM symbols. As will be appreciated, the scheduling may not allow for sub OFDM symbol granularity and lower layers will then suppress a fraction of the time samples of the OFDM symbol to allow the UE to switch during the time period corresponding to the fraction of time samples. In receive mode, the UE may just ignore the fraction of time samples transmitted by the other entity during the embedded switching intervals.

In embodiments where the electronic device is, implements, is incorporated into, or is otherwise part of either a user equipment (UE) or a base station (BS), the electronic device 130 may include radio frequency (RF) circuitry 306 and baseband circuitry 304 coupled with the RF circuitry 306. The baseband circuitry 304 may be configured to blank, and/or cause the RF circuitry to blank, an OFDM symbol within a subframe and embed within the time interval of the blanked OFDM symbol the TDD switching interval instead. In more detail, the electronic device and the other side entity may be pre-configured not to transmit or receive data during a time period corresponding to an OFDM symbol in the subframe such that the electronic device will have time to control components of the RF circuitry 306 and the FEM circuitry 308, to switch from TX to RX mode or from RX to TX mode during the time period corresponding to the OFDM symbol. The other side entity may similarly carry out switching from TX to RX mode or from RX to TX mode.

In more detail, the UE and the base station exchange data over time frames defined by the physical layer of the protocol stack used by the radio access network. Each frame may be divided into a plurality of subframes and each subframe may comprise a number of time periods allocated for transmitting or receiving symbols which may be OFDM symbols. Each (OFDM) symbol may in turn comprise a number of time samples for communicating data. In a wireless communications network implementing a 3GPP LTE-A communications standard, for example as set out in 3GPP TS 36.211 V12.7.0 (2015-09) and V13.0.0 (2015-12), each frame is 10 ms long. The frame comprises 10 subframes of 1 ms and each subframe comprises two slots of 0.5 ms. Each slot in turn comprises 7 or 6 symbols depending on if a normal or extended cyclic prefix is used. As will be appreciated, a cyclic prefix, or guard period, is typically added at the beginning of the OFDM symbol to reduce inter-symbol interference. The sampling frequency may be 30.72 MHz corresponding to a slot of 15360 time samples. In LTE, most OFDM symbols may comprise 2192 samples (including the cyclic prefix (CP)) apart from the first symbol in each slot of the subframe which will have a longer CP and comprise 2208 samples.

The subframes may be significantly shorter in a 5G wireless communications network. As a specific example each subframe may be 0.2 ms long. Each subframe may for example comprise 14, 26 or 28 symbols. However, in other implementations it may comprise fewer or additional symbols. Some networks may support hybrid sampling in which the UE and the base station may sample at two different sampling frequencies within a single subframe. In those cases, each subframe may comprise a first plurality of slow OFDM symbols and a second plurality of fast OFDM symbols as will be described in more detail below.

Figure 4:
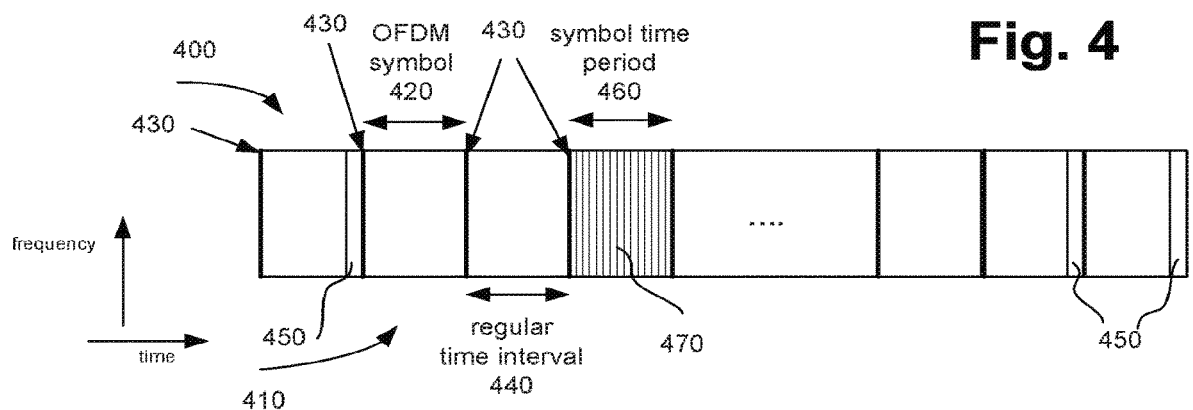
FIG. 4 schematically illustrate a flexible time grid for use in the network of FIG. 1.

With reference to FIG. 4, an example of a subframe 400 for use in the network of FIG. 1 with regular OFDM symbol spacing times is shown. The subframe includes a regular time grid 410 with new OFDM symbols 420 starting at symbol spacing times 430 separated by regular time intervals 440. Consequently, if multiple UEs communicate in the network they can all align to the known regular time grid. Switching intervals 450 are embedded within the time periods 460 corresponding to the OFDM symbols where a switch from uplink to downlink or downlink to uplink occurs. In FIG. 4, the time intervals 440 between adjacent spacing times 430 correspond to the time periods 460 corresponding to OFDM symbols. In other words, in the subframe of FIG. 4, the sampling frequency is selected such that each OFDM symbol 420 starts at a symbol spacing time 430. However, as mentioned above, a faster sampling frequency may be used such that an integer multiple of symbols can be generated and included between two adjacent sampling times. Each symbol 420 corresponds to a plurality of time samples 470 and the switching interval spans at least a portion of the time samples, or more specifically a time period correspond to the portion of the time samples, of the OFDM symbol in which the switching interval is embedded. Some of the time samples of an OFDM symbol may belong to a cyclic prefix guard period. It will be appreciated that although the switching intervals are shown in FIG. 4 at the end of the symbol time period, they may alternatively be provided at the beginning of a time period. Moreover, as mentioned above, the switching interval may in other implementations correspond to an entire OFDM symbol time period. FIG. 4 only shows one subcarrier. However, it will be appreciated that the data may be communicated over multiple subcarriers.

In other implementations, the time grid may not be perfectly regular but the start time of the majority of OFDM symbols will still coincide with the regular OFDM symbol spacing times defined by the grid or with regular sub-spacing times between two adjacent symbol spacing times. For example, the time period between two symbol spacing times may be slightly longer than the time periods between remaining adjacent spacing times. For example, the first symbol may use a longer cyclic prefix. In some implementations all electronic devices communicating in the network would be pre-configured to use a time grid with one or more symbol spacing time slightly shifted to provide one or more slightly longer time periods corresponding to an OFDM symbol in the subframe.

Figure 5:
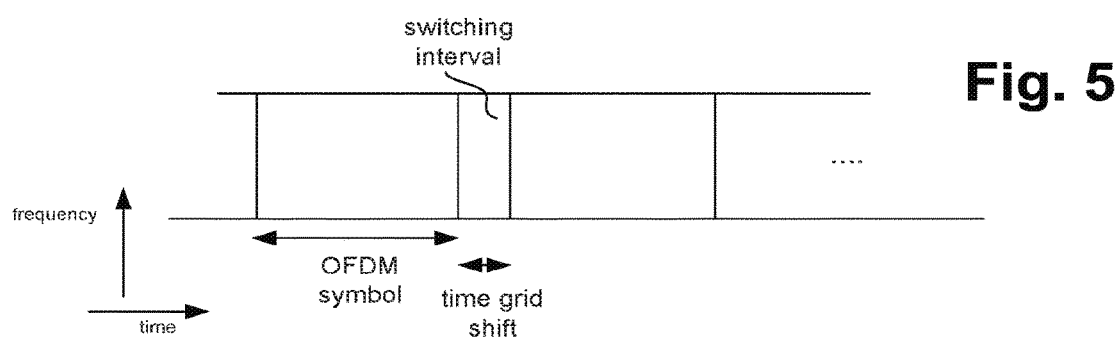
FIG. 5 schematically illustrates a proposed 5G time grid of a published proposal.

With reference to FIG. 5, an example of an alternative time grid in which switching intervals are added between symbols, where switching between DL and UL or UL and DL occurs, and not embedded within symbols are shown. FIG. 5 only shows two symbols of a subframe. A switching interval is added in between the OFDM symbols, resulting in that the OFDM symbols do not start at regular time intervals but may instead be shifted because of the switching interval. If switching intervals are arbitrarily added to provide a specific UL/DL allocation within the subframe, to support flexible allocations of symbols to the uplink and downlink, the start time of OFDM symbols used in one cell may not align with the start time of OFDM symbols used in another cell. Moreover, if a cell has multiple transmitters, in principle multiple deviating time grids, with overlapping time periods corresponding to OFDM symbols, may be employed in the same cell. A mechanism for providing switching intervals corresponding to that shown in FIG. 5, has been publically proposed for 5G deployment in RWS-150010, Nokia, 5G WS 3GPP contribution, Sep. 17 to 18, 2015, Phoenix Ariz., U.S. In that proposal, three switching intervals add to the actual OFDM+CP time slots.

Figure 6:
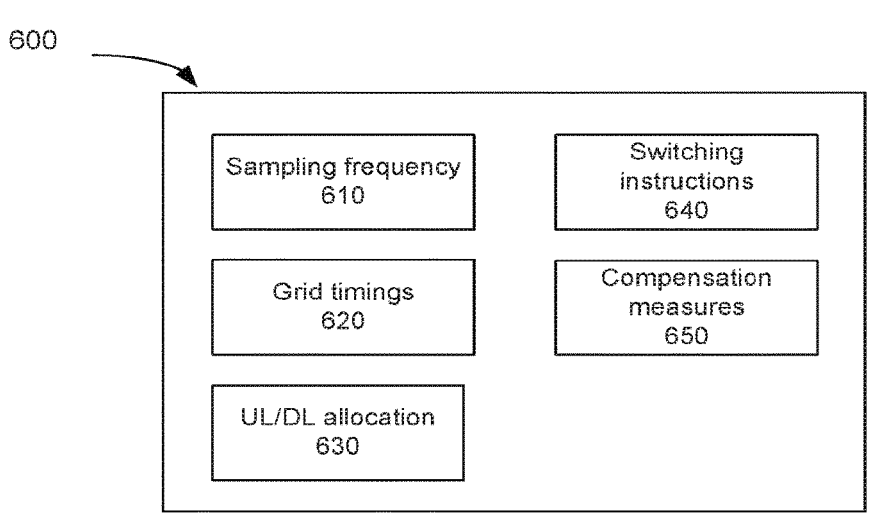
FIG. 6 is a schematic block diagram illustrating data stored in memory of a base station or a UE of the network.

With reference to FIG. 6, the memory 600 of the UE and the base station comprises data and instructions for communicating using the time grid described herein and embedding switching intervals within the time grid while still reliably receiving and transmitting data. The memory 600 may for example form part of the memory of the baseband circuitry 304 of FIG. 3. However, it will be appreciated that parts of the memory may not form part of the baseband circuitry. It could for example form part of the application circuitry. Alternatively, or additionally, the memory may form part of the memory 207 of FIG. 2. The memory may include any combination of suitable volatile memory and/or non-volatile memory, including, but not limited to, read-only memory (ROM), random access memory, cache, buffers, etc. The memory may be shared among various processors, for example processors of the baseband circuitry 304, or dedicated to particular processors. The memory stores at least one sampling frequency 610, the grid timings 620, data defining the allocation between uplink and downlink for each subframe 630 and also instructions 640 for carrying out the switching between RX and TX mode and/or vice versa. The grid timings may for example include the symbol spacing times 430 described for example with respect to FIG. 4. The at least one sampling frequency 610 may comprise two sampling frequencies if a hybrid sampling solution is used. The memory may also store instructions 650 for implementing compensation measures if appropriate for compensating for, or preventing, loss of data that was to be received or transmitted during the time the UE switched from RX to TX or vice versa. The instructions in memory may, when executed by for example one or more baseband processors, cause the one or more of the baseband processors to embed switching intervals within the time periods corresponding to OFDM symbols and further cause the baseband processors to carry out other processes described herein.

The UE may receive the UL/DL allocation 630 for each subframe from the base station and both the UE and the base station may store the allocation data in memory. In a network implementing a 3GPP 5G wireless communication standard, the allocation may be semi-dynamic and negotiable between the UE and the eNB. In contrast to current LTE networks it would not be fixed to one out of a small number of configurations that are static within the network. The UE and the base station will then identify, based on the UL/DL allocation 630 and the grid timings 620, when to switch their respective transceiver circuitry. Each device would then access its switching instructions 640 to carry out the switching. Each device may also carry out compensation measures 650 to ensure proper receipt or transmission of scheduled data or limit signal quality degradation. Examples of compensation measures are set out in more detail below.

In order to establish an (almost) perfect regular (OFDM) symbol spacing time grid with embedded more or less challengingly short TDD switching intervals, the receiving or transmitting device may be configured to follow one of the following processes:

The receiving or transmitting device may steal/ignore or blank any fraction of the time samples 470 of an OFDM symbol 420. "Ignoring' or 'stealing' may be understood in some examples to mean not receiving data sent by the other side during the time periods or not transmitting data scheduled for transmission during the time periods. 'Blanking' may be understood in some examples to mean not transmitting or receiving data the entities wish to communicate during time samples in at least a portion of the OFDM symbol in accordance with a previous agreement with the other side. In some implementations, the fraction may include up to 10% of the time samples. In other implementations, the fraction may include a smaller or greater percentage of the time samples.

The other side may or may not be aware that the device will steal or ignore the fraction of time samples. The device may therefore take standardization-related or transparent or any combination of appropriate measures as will be described below. It will be appreciated in the following descriptions the term 'transparent' is used to mean that a device is not aware of the described action taken by the other side. In other words, the action is not 'visible' to or known by the device.

i. On the transmit side, maximization of the (remaining) spectral efficiency on the OFDM symbol may be performed. For example, this may include increasing the robustness of channel coding for some symbols.

ii. Optimization of receiver-side processing may be performed. In some implementations, this may include more advanced decoding, demodulation and error correction processing. In some situations, the receiving side may not be able to recover all data it was meant to receive and the signal quality may then deteriorate. However, the switching interval may be sufficiently short to limit the signal deterioration to an acceptable level.

iii. Base station and UE may be aware of and "agree" on methods for either, on the transmit side, maximization of the (remaining) spectral efficiency on the OFDM symbol to be performed and/or optimization of receiver-side processing to be performed. For example, the base station and the UE may agree on using improved modulation/demodulation, coding/decoding or error correction techniques.

iv. UE receiver may autonomously compromise the OFDM symbol with BS-transparent solutions for optimization of receiver-side processing.

v. BS receiver may autonomously compromise the OFDM symbol with UE-transparent solutions for optimization of receiver-side processing.

Where the UE receiver autonomously compromises the OFDM symbol with BS-transparent solutions for optimization of receiver-side processing and/or the BS receiver autonomously compromises the OFDM symbol with UE-transparent solutions for optimization of receiver-side processing, the amount of samples that are stolen or ignored may vary from device to device or from situation to situation and may be transparent to the transmitter side. The amount of samples that are stolen or ignored from device to device or from situation to situation could be amended with a minimum performance requirement on the receiver side.

In some embodiments described herein, TDD switching intervals may embedded by blanking one of the fast sampled OFDM symbols in a hybrid sampling solution combining two or more sampling rates in a single subframe or in selected positions of a subframe block (SFB). A subframe block may comprise multiple subframes forming a self-contained block. The SFB may contain the DL and UL control and data needed for the block to be self-contained. More specifically, where the receiving and transmitting entity have previously agreed, the receiving and transmitting entity may have agreed to use a faster sampling rate during the time periods in which the TDD switching intervals are to be embedded. Consequently, the baseband circuitry or other processing circuitry may use a first sampling frequency, stored as part of the sampling frequencies 610 stored in memory, for some of the samples and a second faster sampling frequency, also stored as part of the sampling frequencies 610 stored in memory 500, for some other samples. The same data may accordingly be transmitted in a portion of the time in the 'fast' OFDM symbols and the other portion of the time period corresponding to a 'slow' OFDM symbols can be used as a switching interval.

Consequently, the switching interval can be considered to be embedded within a time period corresponding to a slow OFDM symbol. The switching interval may be embedded within a time period corresponding to a fast OFDM symbols within the slow symbol time period. In some of these embodiments, one sampling rate may be approximately or exactly twice of the other sampling rate, e.g. 153.6 MHz (5*LTE sampling rate) and 307.2 MHz sampling (10*LTE sampling rate). In some of these embodiments, the hybrid sampling solution may use two or more sampling rates with arbitrary ratios. For example, one sampling rate may be 153.6 MHz and the second sampling rate may be 230.4 MHz. The compensation measures instructions 650 in memory may together with the switching instructions cause one or more baseband processors to apply the different sampling rates at selected positions within the subframe or SFB.

In some embodiments, TDD switching intervals may be embedded as blanked OFDM symbols. More specifically the receiving and the transmitting entity may have agreed not to receive or transmit data that they wish to communicate to each other throughout a whole symbol and use the time interval to switch between receive mode and transmit mode or vice versa.

The time grid may be LTE-congruent. In other words, the length of the LTE subframe may be an integer multiple of the length of the 5G subframe and may enable coexistence or interference management in all kinds of 5G and LTE heterogeneous use cases benefiting from synchronicity. As an example, when the control and data network 110 of FIG. 1 comprises both an LTE EPC and a 5G core network, signalling may be carried out with both UEs communicating with a LTE RAN and UEs communicating with a 5G RAN.

Table 1 summarizes some solutions for establishing a regular time grid with embedded TDD switching intervals or slots and the related numerology examples for implementation. As will be clear from the table, the TDD switching intervals ranges between 1 µs, 2.5 µs, and more than 7 µs.

TABLE 1

| | LTE FDD SF | Published Proposal (Nokia) | (1) (Puncturing by sample stealing) | (2 a/3 a) (Blanking fast OFDM symbol, LTE SF congruent) |
|---|---|---|---|---|
| Ts | 3.25521E−08 | 6.51042E−09 | 6.51042E−09 | 3.25521E−09 |
| Subcarrier Spacing [Hz] | 15000 | 75000 | 75000 | 150000 |
| FFT [to achieve 100 MHz BW] | 2048 | 2048 | 2048 | 2048 |
| Stolen samples from switching OFDM symbol | 0 | 0 | 315 | 0 |
| OFDM symbol length [µs] | 66.66666667 | 13.33333333 | 13.33333333 | 6.666666667 |
| # Regular time slots: CP_default + OFDM | 12 | 14 | 13 | 27 |
| # Irregular time slots: CP_special + OFDM | 2 | n/a | 1 | 1 |

TABLE 1-continued

| | | | | |
|---|---|---|---|---|
| # TDD switching slots | n/a | 3 | 3 | embedded |
| Samples in CP_default | 144 | 115 | 146 | 146 |
| Cyclic Prefix [μs] | 4.6875 | 0.748697917 | 0.950520833 | 0.475260417 |
| Samples in CP_special | 160 | n/a | 150 | 154 |
| Special Cycle Prefix [μs] | 5.208333333 | n/a | 0.9765625 | 0.501302083 |
| Samples in TDD switching slot | n/a | 146 | n/a | n/a |
| Switching time [μs] | n/a | 0.95 | 3.00 | 7.14 |
| Time in regular time slots [ms] | 0.85625 | 0.197148438 | 0.185690104 | 0.192832031 |
| Time in irregular time slots [ms] | 0.14375 | n/a | 0.014309896 | 0.007167969 |
| Time in TDD switching slots [ms] | n/a | 0.002851563 | n/a | n/a |
| Check Sum SF [ms] | 1 | 0.2 | 0.2 | 0.2 |

| | (2 a/3 a) (Blanking fast OFDM symbol, LTE SF congruent, Extended CP) | (2 b/3 b) (Blanking fast OFDM symbol, perfect grid) | (2 b/3 b) (Blanking fast OFDM symbol, perfect grid) |
|---|---|---|---|
| Ts | 3.25521E−09 | 3.25521E−09 | 3.25521E−09 |
| Subcarrier Spacing [Hz] | 150000 | 150000 | 150000 |
| FFT [to achieve 100 MHz BW] | 2048 | 2048 | 2048 |
| Stolen samples from switching OFDM symbol | 0 | 0 | 0 |
| OFDM symbol length [μs] | 6.666666667 | 6.666666667 | 6.666666667 |
| # Regular time slots: CP_default + OFDM | 25 | 28 | 26 |
| # Irregular time slots: CP_special + OFDM | 1 | 0 | 0 |
| # TDD switching slots | embedded | embedded | embedded |
| Samples in CP_default | 315 | 146 | 315 |
| Cyclic Prefix [μs] | 1.025390625 | 0.475260417 | 1.025390625 |
| Samples in CP_special | 317 | n/a | n/a |
| Special Cycle Prefix [μs] | 1.031901042 | n/a | n/a |
| Samples in TDD switching slot | n/a | n/a | n/a |
| Switching time [μs] | 7.69 | 7.14 | 7.69 |
| Time in regular time slots [ms] | 0.192301432 | 0.199973958 | 0.19999349 |
| Time in irregular time slots [ms] | 0.007698568 | n/a | n/a |
| Time in TDD switching slots [ms] | n/a | n/a | n/a |
| Check Sum SF [ms] | 0.2 | 0.199973958 | 0.19999349 |

The 1$^{st}$ column of Table 1 recaptures the LTE FDD numerology.

The 2$^{nd}$ column summarizes the published frame structure proposal mentioned with respect to FIG. 5, which does not follow a regular time grid. The three switching time intervals of that proposal add to the actual OFDM+cycling prefix (CP) time slots and the switching time intervals are, therefore, not embedded.

All other columns are examples of different variants of regular time grids with embedded TDD switching intervals as have already been described herein.

The 3$^{rd}$ column captures a numerology where a fraction of the OFDM symbol's time samples may be "stolen" or simply suppressed.

The 4$^{th}$ column captures a (sample) numerology where either those parts of the self-contained subframe that are to embed TDD switching intervals may be operating at a higher sampling rate as will be further described with respect to FIG. 7a or the whole system may operate at a higher sampling rate as will be described in more detail with respect to FIG. 7b. The TDD switching interval or interval may be obtained by blanking an OFDM symbol of the area of the higher sampling rate.

The 5$^{th}$ column may capture a modification with an extended CP to allow for the same propagation delay spread (and cell sizes) as proposed in the published proposal of which the time grid of the second column forms a part.

The 6$^{th}$ and 7$^{th}$ column may differ from the 4$^{th}$ and 5$^{th}$ columns of Table 1 in the fact that they may target the perfectly regular time grid.

As can be seen from Table 1, all the solutions have a switching time shorter than 8 μs. Moreover, the OFDM symbol lengths of the time grids proposed in the 3$^{rd}$ to 7$^{th}$ columns are an integer ratio of the LTE OFDM symbol length of approximately 66.67 μs.

It will be appreciated that although specific switching times, frequencies and other variables have been specified for the different solutions in Table 1, the various mechanism of which the solutions are examples may be implemented with alternative times, frequencies and other values.

In accordance with embodiments wherein the sampling rates are two or more rates with arbitrary ratios, further sampling rates may be used for those time slots that may embed the TDD switching interval. Other sampling rates may allow for better suited shorter embedded TDD switching intervals. To introduce such additional flexibility in choosing the OFDM symbol length and still having a simple hardware, variations, as listed in Table 2, may be considered. Table 2 shows various sampling frequencies and their relation to an efficient HW implementation. As can be seen from Table 2, the sampling rates may be an integer multiple, such as 3, 4, 6 or 8 times, the clock rate of the processor carrying out the sampling. The sampling frequencies could be integer multiples or fractions of the sampling frequency of a legacy LTE network.

TABLE 2

| Clock MHz | Multiplier | Frequency MHz | FFT Size | FFT Length µs | Bandwidth FFT Bin kHz | Number of Bins | Bandwidth Channel kHz |
|---|---|---|---|---|---|---|---|
| 38.4 | 3 | 115.2 | 2048 | 17.78 | 56.25 | 1600 | 90000 |
|  | 4 | 153.6 | 2048 | 13.33 | 75 | 1200 | 90000 |
|  | 6 | 230.4 | 2048 | 8.89 | 112.5 | 800 | 90000 |
|  | 8 | 307.2 | 2048 | 6.67 | 150 | 600 | 90000 |

In more details, in all cases in Table 2, a constant (effective) channel bandwidth of 90 MHz (for 100 MHz channel distance) may be utilized and a constant FFT size may be 2048. For LTE, one Physical Resource Block (PRB) may have 12 FFT Bins. Here one PRB may have either 6, 8, 12 or 16 FFT Bins. Still, integer multipliers of the Quartz frequency may be utilized. Thus, the length of the OFDM symbol (in Table 2 listed without cyclic prefix under 'FFT length') may be scaled to obtain more freedom of the time duration of the "don't care" time interval (which equals the TDD switching interval).

Various examples of blanking of OFDM symbols sampled at a faster sampling frequency will now be described with respect to FIGS. 7 to 10. The subframes shown in FIGS. 7 to 10 include DL control (DL ctrl), UL control (DL), demodulation reference signal (DMRS) and Physical Downlink Shared Channel (PDSCH) time slots and embedded switching intervals or switch slots. FIGS. 7 to 9 show subframes that comprise more than one embedded switching intervals. FIG. 10 show subframe blocks in which switching intervals are eliminated in one of the subframes.

Figure 7A:
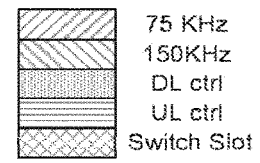
FIGS. 7a and 7b schematically illustrate examples of embedding switching intervals in time grid for use in the network of FIG. 1.
Figure 7A:
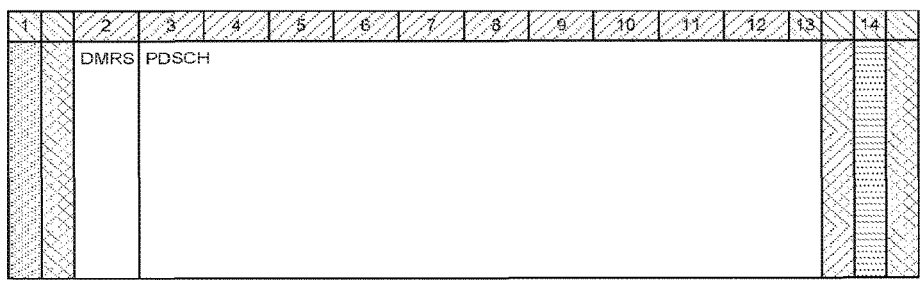
Figure 7B:
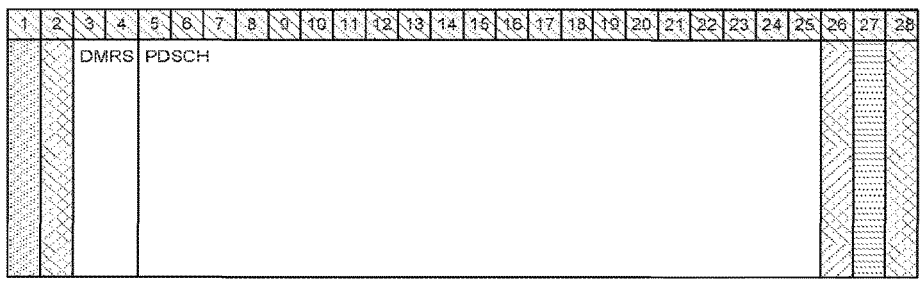

FIGS. 7a and 7b illustrates three default embedded TDD switching intervals for the hybrid sampling (153.6 MHz and 307.2 MHz) and the fast sampling (307.2 MHz) implementations. The figures illustrate embodiments using blanking of fast OFDM symbols. In other words, the entities will have agreed to use a higher sampling rate in at least a portion of the subframe and not to transmit and receive in some of the faster samples. FIG. 7a shows the hybrid sampling where the system may switch to a faster sampling for a period of 3 slow/6 fast OFDM time grid slots. As can be seen, the first and the two last OFDM symbols are split into six fast OFDM symbols. FIG. 7b shows a time grid in which the faster sampling rate is applied throughout the subframe. The hybrid solution might be targeted if power consumption and/or overheating of a device could be an issue (if faster sampling was used throughout) and fast sampling periods may be established at the end of a subframe aggregate.

The cross-hatched slots in FIGS. 7a and 7b indicate the approximately 7 µs switching intervals that may allow for a cost-optimized device implementation.

FIG. 8 shows reduced time durations of embedded TDD switching intervals with a hybrid of 153.6 MHz and 230.4 MHz sampling rates. Again, the entities will have agreed to use a higher sampling rate in some periods and transmit and receive data they wish to communicate with each other in some of the faster samples in those periods. The remaining time of the time period corresponding to a 'slow' OFDM symbol can then be used as a switching interval.

FIGS. 9a and 9b illustrate a DL optimisation and a UL optimisation of a self-contained subframe, respectively, with 2 out of 3 TDD switching intervals. While FIGS. 7a and 7b depict the default pattern of three TDD switching intervals in a self-contained subframe, the number of TDD switching intervals may of course be reduced to two as shown in FIGS. 9a and 9b for mainly DL or UL usage of the self-contained subframe. In FIGS. 9a and 9b hybrid solutions using two sampling rates in which the faster sampling rate is twice as fast as the slow sampling rate, as was also the case in the solution of FIG. 7a, are shown. In FIG. 9a, all OFDM symbols apart from the UL control symbol towards the end of the subframe are used by the downlink. In FIG. 9b, all OFDM symbols apart from the very first symbol which is a DL control symbol are used by the uplink.

FIGS. 10a and 10b illustrates an example of elimination of TDD switching intervals in a subframe block (SFB). As can be seen in FIG. 10b, the two self-contained subframes of FIG. 10a are combined in FIG. 10b in a SFB. If more than one subframe is allocated to downlink and the subframes are combined into a SFB, switching from TX to RX in the base station or from RX to TX in the UE may only occur at the end of the block. Accordingly, as illustrated by the first subframe of FIG. 10b, the number of TDD switching intervals can be zero in a subframe if it is part of a Subframe Block (SFB). In other words, one or more subframes of a subframe block may not include any TDD switching intervals.

As mentioned above, in some embodiments, the UE or the base station or another electronic device represented by the device of FIG. 3 may be configured to perform one or more processes, techniques, and/or methods as described herein, or portions thereof.

Figure 11:
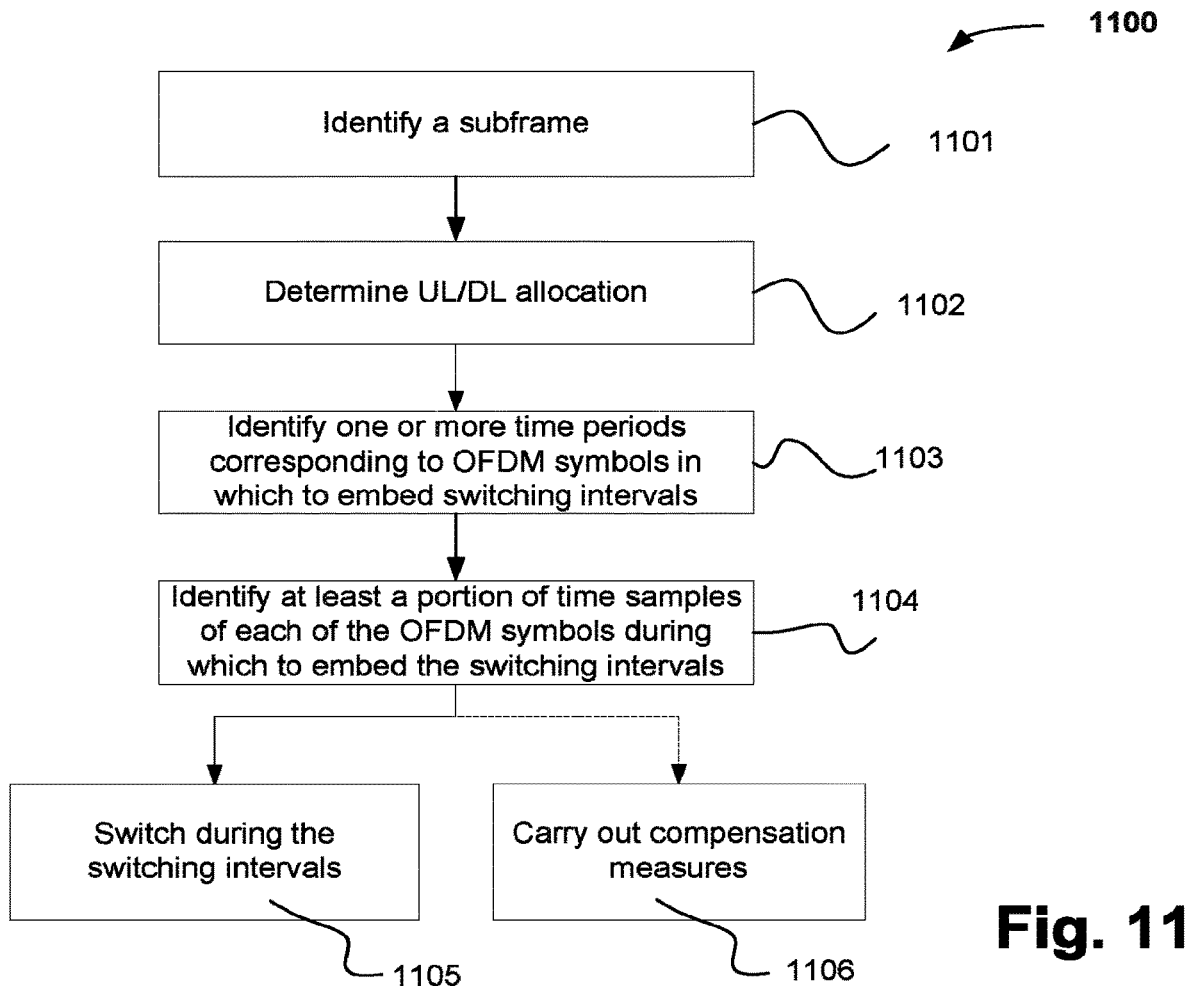
FIG. 11 depicts a flow diagram of processing operations associated with embedding switching intervals in TDD time grids in an electronic device.

One such process is shown in FIG. 11. The process 1100 may be carried out by either a UE or a base station. The process comprises identifying a subframe 1101. The subframe may be a subframe corresponding to either received data or data to be transmitted. The process further comprises determining 1102 the UL/DL allocation for the subframe and therefore when the transceiver circuitry will have to switch between receive mode and transmit mode and vice versa. This may be done based on the UL/DL allocation 630 in memory. The process subsequently identifies 1103 one or more time periods corresponding to OFDM symbols in which the switching will take place. This may be done based on switching instructions in memory and grid timings. The time periods corresponding to OFDM symbols may be time periods corresponding to fast OFDM symbols generated using a fast sampling rate.

The UE or the base station then identifies 1105 at least a portion of each identified OFDM symbol in which to carry out the switching, depending on the switching instructions in memory. For example, if the switching instructions indicated that the UE or base station should blank the whole symbol, the UE or base station may determine that the UE or base station does not need to receive or transmit during all the time samples of the symbol. If the switching instructions indicate that the UE or base station should use a higher sampling rate during a portion of a subframe where the switching interval is to be embedded, the UE or base station may determine that the whole of a fast OFDM symbol can be used for the switching interval if desired. If the switching instructions indicate that the UE or base station should just ignore or suppress some time samples, the UE or base station identifies the portion of the symbol corresponding to the time samples. The UE or the base station then switches 1105 the transceiver circuitry during the identified OFDM symbols or the identified time samples of the OFDM symbols. It will be appreciated that when the whole OFDM symbol can be used for switching, the process may not comprise identifying at least a portion of time samples 1104.

The UE or base station may also apply 1106 compensation measures to ensure reliable reception or transmission of data or limit signal degradation. The compensation measures may be applied before any data is transmitted in the OFDM symbol or after some data in the OFDM symbol has been received. The compensation measures may include maximizing spectral efficiency on the transmit side or optimize received-side processing. The compensation measures may include increasing the sampling rate during at least some time periods of the subframe or subframe block. It will be appreciated that although the performance of the compensation measures are indicated in FIG. 11 to be carried out in parallel with the switching of the transceiver circuitry it may be carried out before or after. In some implementations, no compensation measures are carried out.

Figure 12:
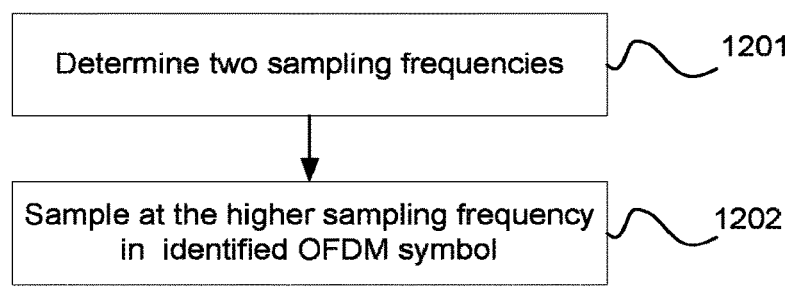
FIG. 12 depicts a flow diagram of processing operations associated with embedding switching intervals in TDD time grids in an electronic device.

FIG. 12 shows one example of carrying out measures to increase the sampling frequency in more detail. The example process 1200 involves determining two sampling frequencies 1201 and subsequently sampling 1202 at the higher sampling frequency during the time periods in which the switching intervals are to be embedded.

Although the operations of FIG. 11 and FIG. 12 have been described in a specific order, a different order is also possible. For example, it will be appreciated that the determination of the two sampling frequencies in FIG. 12 may be carried out before some of the operations of FIG. 11. For example, two sampling frequencies may be determined before the one or more symbols in which to embed switching intervals are embedded and, as mentioned above, the identified OFDM symbols may be the fast OFDM symbols generated at the higher sampling frequency.

Figure 13:
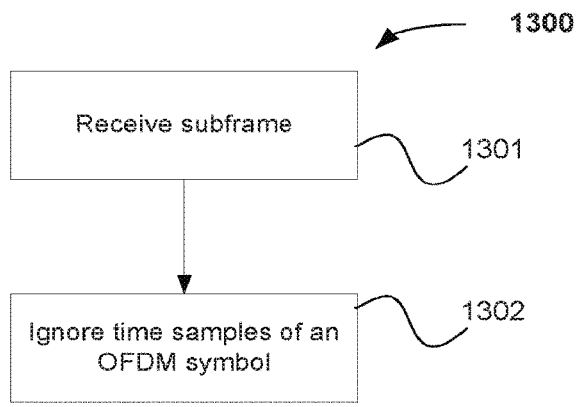
FIG. 13 depicts a flow diagram of processing operations associated with embedding switching intervals in TDD time grids in an electronic device.

Another example of a process in the UE or the base station is depicted in FIG. 13. The process 1300 shown relates to processes in a receiving entity involving ignoring time samples. For example, the process may include receiving, or causing to receive, a subframe 1301 and ignoring, or causing to ignore, a fraction of time samples of an OFDM symbol within the subframe 1302. The receiving entity may switch the transceiver circuitry to TX or RX mode during the time samples. Appropriate measures for compensating for any ignored data intended for the UE have been described above.

Figure 14:
FIG. 14 depicts a flow diagram of processing operations associated with embedding switching intervals in TDD time grids in the electronic device.

Yet another such process is depicted in FIG. 14. The process 1400 shown relates to processes in transmit mode involving suppressing time samples. For example, the process may include obtaining, or causing to obtain, a subframe 1401 to be transmitted to a remote device and suppressing, or causing to suppress, a portion of time samples of a OFDM symbol within the subframe to be transmitted 1402. The transmitting entity may switch its transceiver circuitry to TX or RX mode during the time samples. Appropriate measures for compensating for any suppressed data scheduled to be transmitted have been described above.

Figure 15:
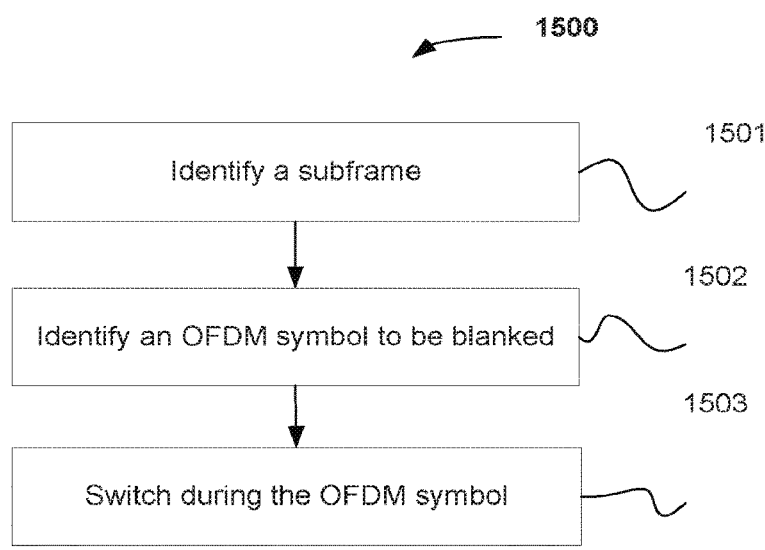
FIG. 15 depicts a flow diagram of processing operations associated with embedding switching intervals in TDD time grids in the electronic device.

Another such process is depicted in FIG. 15. The process 1500 relates to operations when a whole OFDM symbol is blanked. In other words, all the time samples are ignored based on agreement between the receiving and transmitting entity. The process involves identifying 1501 a subframe and identifying 1502 an OFDM symbol within the subframe to be blanked. The process further involves switching 1503 the transceiver circuitry from TX to RX or RX to TX mode during the time period corresponding to the OFDM symbol.

Figure 16:
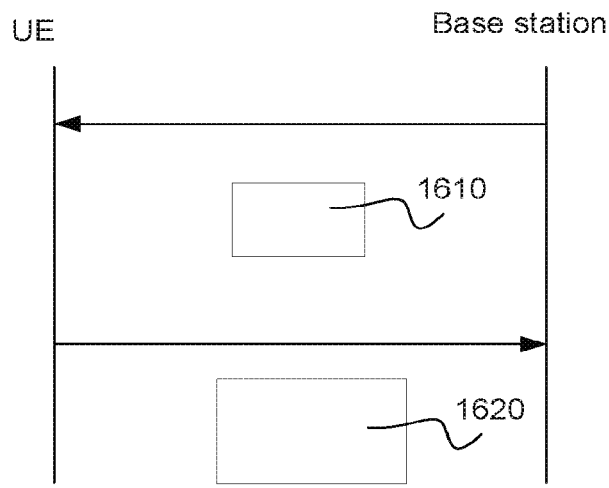
FIG. 16 illustrates signaling between a UE and a base station.

With reference to FIG. 16, the base station may send a wireless signal comprising a message 1610 with data to the UE in the downlink. At some time later, the UE may send a wireless signal comprising a message 1620 with data to the base station. It may for example acknowledge receipt of the first message 1610. The data may be control data or traffic data. In order to change from receive mode to transmit mode to send the second message 1620, the UE may switch its transceiver circuitry. Similarly, the base station may change from transmit mode to receive mode to receive the second message 1620. It may carry out the switching during selected time periods corresponding to OFDM symbols as described herein.

Figure 17:
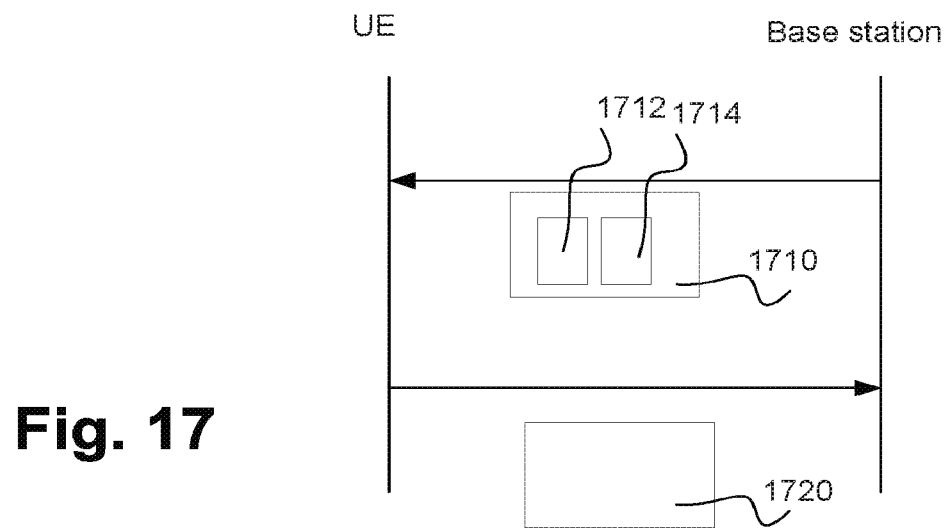
FIG. 17 also illustrates signaling between a UE and a base station.

With reference to FIG. 17, in some embodiments described herein, the base station and the UE exchange messages 1710, 1720 for agreeing when to carry out the switching and the compensation measures to apply. For example, the message from the base station may comprise timing data 1712 and compensation measure instructions 1714 to enable the base station and UE to carry out the switching at the same time and apply corresponding compensation measures. The timing data 1712 may comprise an indication of an OFDM time period in which to embed a switching interval. As a specific example, the timing data 1712 may comprise an indication of an OFDM symbol to be blanked.

Figure 18:
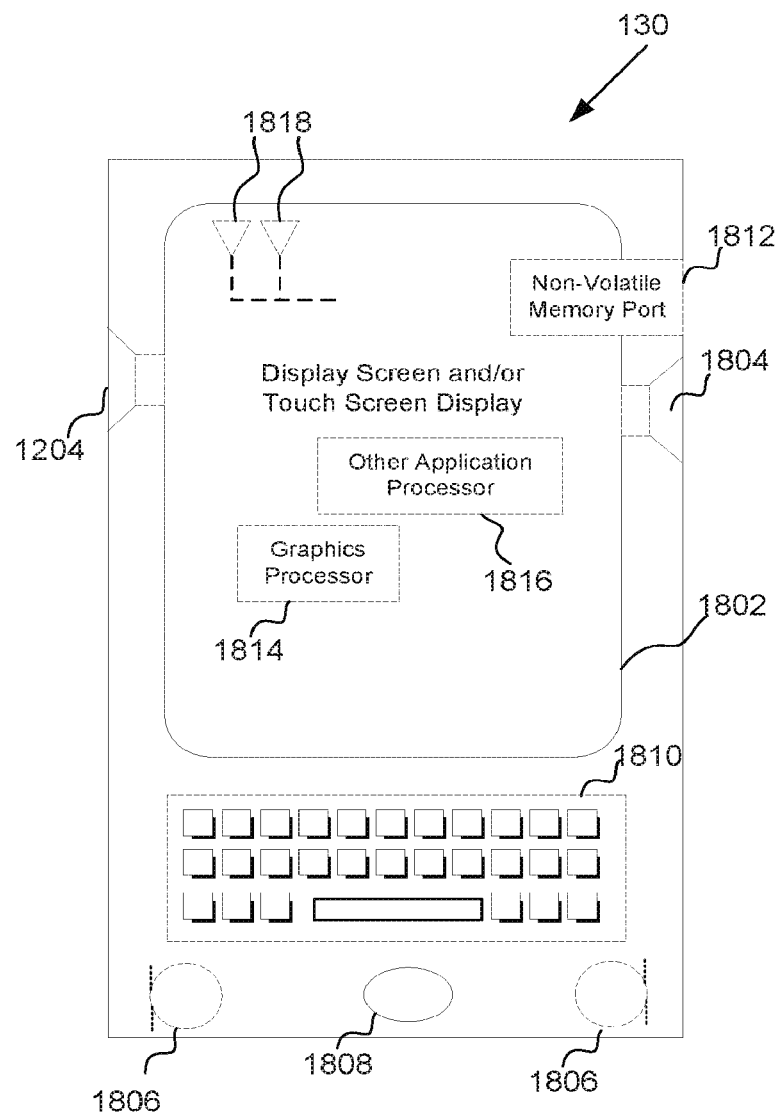
FIG. 18 is a schematic block diagram illustrating some components of the UE.

It will be appreciated that the UE can be implemented in other ways than described with respect to FIGS. 3 and 6 and may comprise alternative or additional components. Additional components of a UE, which can be used in the network described herein, are shown in FIG. 18. For example, the UE may comprise one or more user interfaces, one or more peripheral component interfaces and one or more sensors. In various embodiments, user interfaces could include, but are not limited to, a display 1802 (e.g., a liquid crystal display, a touch screen display, etc.), a speaker 1804, a microphone 1806, one or more cameras 1808 (e.g., a still camera and/or a video camera), a flashlight (e.g., a light emitting diode flash), and a keyboard 1810, taken jointly or severally in any and all permutations. In various embodiments, the peripheral component interfaces may include, but are not limited to, a non-volatile memory port, an audio jack, and a power supply interface. In various embodiments, the sensors may include, but are not limited to, a gyro sensor, an accelerometer, a proximity sensor, an ambient light sensor, and a positioning unit. The positioning unit may interact with a receiver chain of the UE to receive signals from components of a positioning network, e.g., a global positioning system (GPS) satellite. In various embodiments, the UE may be a mobile computing device such as, but not limited to, a laptop computing device, a tablet computing device, a netbook, a mobile phone, etc. In various embodiments, the UE may have more or fewer components, and/or different architectures. Additionally, the mobile device 130 may comprise at least one or more of a memory port 1812 for receiving additional memory (not shown), a graphics processor 1814 and an application processor 1816, taken jointly and severally in any and all permutations. The mobile device can comprise one, or more than one, antenna 1818.

As mentioned above, some embodiments relate to a regular fifth generation orthogonal frequency demodulation time grid with embedded time division duplex switching intervals. While establishing the regular 5G OFDM time grid with embedded TDD switching intervals, differentiations may include:

An almost perfect but LTE-congruent time grid, i.e., the LTE subframe may be an integer multiple of the 5G subframe and may enable coexistence or interference management in all kinds of 5G and LTE heterogeneous use cases benefiting from synchronicity.

Perfectly regular time grid, i.e., may enable 100% L1 channel assembly flexibility as well as coexistence and interference management within a synchronized 5G network, on the other hand, however, with a slowly progressing deviation from to the LTE frame or subframe structure.

Embodiments described herein may provide a perfect or an almost perfect regular 5G OFDM time grid with embedded switching times. In embodiments, the wireless network of FIG. 1 may implement a 3rd Generation Partnership Project's 5G network but it may also implement a 3rd Generation Partnership Project's long term evolution (LTE) advanced (LTE-A) or a LTE-A Pro wireless communication standard, which may include, but is not limited to releases 14, or later, of the 3GPP's LTE-A and LTE-A Pro standards. The time grid with embedded switching intervals may be LTE congruent to allow a smooth transition from LTE to a 5G network.

Although specific embodiments and implementations have been illustrated and described herein, it will be appreciated by those of ordinary skill in the art that a wide variety of alternate and/or equivalent embodiments or implementations designed to achieve the same purposes may be substituted for the specific embodiments and implementations shown and described, without departing from the scope of the present disclosure. This application is intended to cover any adaptations or variations of the embodiments discussed herein. Therefore, it is manifestly intended that the embodiments of the present disclosure be limited only by the claims and the equivalents thereof.

It will be appreciated that although implementations of the base station, the UE, and the time grids have been described with respect to specific examples shown in the drawings other implementations are contemplated. It will be appreciated that although it has been described that a base station in the network may be an eNodeB or eNB, the description is relevant to any base station that can implement the processes and methods described.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware instructions and/or programs, a combinational logic circuit, and/or other suitable components that provide the described functionality.

Although the examples and embodiments have been described separately with respect to their accompanying drawings, embodiments are not limited thereto. Embodiments can be realized in which the embodiments or examples associated with the figures can be taken jointly and severally in any and all permutations. For example, the features of FIG. 1, and/or the features of the description of FIG. 1, can be taken together with the features of FIG. 2 or the description of FIG. 2 and so on.

Where variations of examples or embodiments have been presented as being at least a member of an enumerated list, either with or without the accompanying language "taken jointly or severally in any and all permutations", it is clear that all permutations of such enumerated list members are contemplated, which is made more emphatic by the accompanying language "taken jointly and severally in any and all permutations" or, where appropriate, "taken jointly and severally in any and all combinations".

Embodiments can be realized according to any of the following clauses and/or examples taken jointly and severally in any and all permutations:

Clause 1. Apparatus for use in a wireless communication network using a time division duplex (TDD) time grid, comprising:

transceiver circuitry to send and receive data in a plurality of time periods, defined by the time grid, to another entity, the plurality of time periods corresponding to a plurality of orthogonal frequency division multiplexing (OFDM) symbols and the transceiver circuitry being operable to switch from receive mode to transmit mode and/or from transmit mode to receive mode according to a flexible uplink and downlink allocation of the plurality of time periods; and baseband circuitry coupled to the transceiver circuitry to control the transceiver circuitry to switch during a switching interval embedded within a time period corresponding to an OFDM symbol of the plurality of OFDM symbols.

Clause 2. Apparatus according to clause 1, wherein the baseband circuitry is operable to operate at at least two different sampling frequencies.

Clause 3. Apparatus according to clause 2, wherein the baseband circuitry is configured to operate at a faster sampling frequency of said at least two different sampling frequencies in at least a portion of a single subframe or a subframe block.

Clause 4. Apparatus according to clause 2 or 3, wherein the baseband circuitry is configured to control the transceiver circuitry to transmit or receive data in one or more fast OFDM symbols generated at a faster sampling frequency of the at least two different sampling frequencies.

Clause 5. Apparatus according to clause 4, wherein the baseband circuitry is configured to control the transceiver circuitry to switch during one or more other fast OFDM symbols generated at the faster sampling frequency.

Clause 6. Apparatus according to clause 4 or 5, wherein the apparatus and the entity have agreed to use the faster of the two different sampling rates.

Clause 7. Apparatus according to clause 1, wherein the baseband circuitry is configured to carry out measures to obtain all data transmitted by the other entity during the time period or limit a level to which the reception of the data transmitted by the other entity during the time period is compromised.

Clause 8. Apparatus according to clause 1, wherein the baseband circuitry is configured to carry out measures to communicate all data scheduled for transmission during the time period or limit a level to which data scheduled for transmission during the time period is compromised.

Clause 9. Apparatus according to clause 7 or 8, wherein the measures have been previously agreed with the other entity.

Clause 10. Apparatus according to clause 7 or 8, wherein the measures are transparent to the other entity.

Clause 11. Apparatus according to clause 1 or any one of clauses 7 to 10, wherein each of the plurality of OFDM symbols comprises a plurality of time samples and the switching interval corresponds to a fraction of said time samples.

Clause 12. Apparatus according to clause 11, wherein the fraction comprises less than 10% of the time samples.

Clause 13. Apparatus according to any one of clauses 11 or 12, wherein the baseband circuitry is arranged to control the transceiver circuitry to ignore data transmitted by the other entity during the switching interval.

Clause 14. Apparatus according to clause 13, wherein the baseband circuitry is arranged to control the transceiver circuitry to ignore the data independent of awareness by the other entity.

Clause 15. Apparatus according to any one of clauses 11 to 14, wherein the fraction of time samples comprises a first portion and the OFDM symbol comprises a second portion of time samples different to the first portion and the baseband circuitry is configured to process data received during the second portion of time samples to limit signal quality deterioration.

Clause 16. Apparatus according to any one of clauses 11 or 12, wherein the fraction of time samples comprises a first portion and the OFDM symbol comprises a second portion of time samples different to the first portion and, when the transceiver circuitry is in transmit mode, the baseband circuitry is configured to increase spectral efficiency on the second plurality of time samples to transmit data scheduled to be transmitted in said OFDM symbol.

Clause 17. Apparatus according to any one of clauses 11 or 12, wherein the transceiver circuitry is operable to suppress a portion of data scheduled to be transmitted during the OFDM symbol.

Clause 18. Apparatus according to clause 17, wherein the transceiver circuitry is operable to suppress data to be transmitted independently of awareness by the other entity.

Clause 19. Apparatus according to any one of clauses 11 to 18, wherein the baseband circuitry is configured to select a number of time samples in said fraction of time samples based on at least one out of the situation and the characteristics of the apparatus.

Clause 20. Apparatus according to any one of clauses 11 to 18, wherein the baseband circuitry is configured to select a number of time samples for said fraction of time samples based on minimum performance criteria for the apparatus in receive mode.

Clause 21. Apparatus according to any one of clauses 1, wherein the switching interval corresponds to the whole OFDM symbol.

Clause 22. Apparatus according to clause 1 or 21, wherein the baseband circuitry is configured not to transmit or receive any data during the time period.

Clause 23. Apparatus according to clause 1, 4, 5, 6 or 22, wherein the apparatus and the entity have previously exchanged at least one message comprising an indication of an OFDM symbol to be blanked and the baseband circuitry is configured not to transmit or receive any data to be communicated with the other entity during the time period corresponding to the OFDM symbol in accordance with the indication in said message.

Clause 24. Apparatus according to any one of the preceding clauses, wherein a position of the OFDM symbol is semi-dynamic and negotiable between the apparatus and the other entity.

Clause 25. Apparatus according to any one of the preceding clauses, wherein the time grid defines a subframe and a plurality of OFDM symbol spacing times within the subframe, each symbol spacing time of the plurality of OFDM spacing times corresponding to a start time of an OFDM symbol of the plurality of OFDM symbols, wherein the symbol spacing times are shared by electronic devices communicating in the wireless communication network.

Clause 26. Apparatus according to clause 25, wherein the time between two OFDM symbol spacing times is equal to the duration of an OFDM symbol, wherein the duration of the OFDM symbol includes the duration of an associated cyclic prefix.

Clause 27. Apparatus according to clause 25, wherein the time interval between two OFDM symbol spacing times is equal to an integer multiple of the duration of an OFDM symbol, wherein the duration of the OFDM symbol includes the duration of an associated cyclic prefix.

Clause 28. Apparatus according to clause 25, 26 or 27, wherein the time interval between two adjacent OFDM symbol spacing times is constant throughout the subframe.

Clause 29. Apparatus according to clause 25, 26 or 27, wherein the time interval between the majority of adjacent OFDM symbol spacing times is constant throughout the subframe.

Clause 30. Apparatus according to clause 29, wherein the time interval between all but two adjacent OFDM symbol spacing times in the subframe is constant throughout the subframe.

Clause 31. Apparatus according to any one of clauses 25 to 30, wherein the baseband circuitry comprises memory for storing the symbol spacing times.

Clause 32. Apparatus according to any one of the preceding clauses, wherein the baseband circuitry controls the transceiver circuitry not to receive or transmit data during the switching interval.

Clause 33. Apparatus according to any one of the preceding clauses, wherein the wireless communication network is a next generation or 5th generation (5G) wireless communication network and the time grid defines a next generation or 5G subframe.

Clause 34. Apparatus according to clause 33, wherein the wireless communication network further implements a Long Term Evolution (LTE) advanced or LTE advanced pro wireless communication standard deploying an LTE subframe and the length of the LTE subframe is an integer multiple of the 5G subframe.

Clause 35. Apparatus according to any one of clauses 3 to 6, wherein the faster sampling frequency is approximately or exactly twice of another sampling frequency of the at least two different sampling frequencies.

Clause 36. Apparatus according to clause 35, wherein the faster sampling frequency is 307.2 MHz sampling and the other sampling frequency is 153.6 MHz.

Clause 37. Apparatus according to any one of clauses 2 to 6, wherein the sampling frequencies include two or more sampling frequencies with arbitrary integer ratios.

Clause 38. Apparatus according to clause 37, wherein the at least two different sampling frequencies comprise a first sampling frequency of 153.6 MHz and a second sampling frequency of 230.4 MHz.

Clause 39. A user equipment (UE) comprising the apparatus of any one of the preceding clauses.

Clause 40. A user equipment according to clause 39, wherein the other entity is a base station.

Clause 41. A user equipment according to clause 32 or 33, further comprising one or more of: a screen, a speaker, a keyboard, multiple antennas and/or a speaker.

Clause 42. A base station comprising apparatus according to any one of clauses 1 to 38.

Clause 43. A base station according to clause 42, wherein the other entity is a user equipment (UE).

Clause 44. A method of communicating in a wireless communication network using a time division duplex (TDD) time grid, comprising:
- identifying a subframe for receiving and/or transmitting data to another entity, the time grid defining a plurality of time periods within the subframe corresponding to a plurality of orthogonal frequency division multiplexing (OFDM) symbols;
- determining the allocation of time periods of the plurality of time periods to uplink and/or downlink communication with the other entity;
- identifying a time period of the plurality of time periods to embed a switching interval for switching from receive mode to transmit mode or from transmit mode to receive mode according to the allocation; and
- causing switching from receive mode to transmit mode or from transmit mode to receive mode during the switching interval.

Clause 45. A method according to clause 44 further comprising using at least two different sampling frequencies to sample data received or to be transmitted in at least a portion of a single subframe or a subframe block.

Clause 46. A method according to clause 45, further comprising generating, using a faster of the at least two different sampling frequencies, a plurality of fast OFDM symbols and blanking one or more of the fast OFDM symbols to embed the switching interval during the blanked one or more fast OFDM symbols.

Clause 47. A method according to clause 44, wherein each of the plurality of OFDM symbol comprises a plurality of time samples and the switching interval corresponds to a fraction of said time samples in an OFDM symbol.

Clause 48. A method according to clause 47, wherein the fraction comprises less than 10% of the time samples.

Clause 49. A method according to clause 47 or 48, further comprising ignoring the fraction of time samples of the OFDM symbol.

Clause 50. A method according to clause 47 or 48, further comprising suppressing data scheduled to be transmitted during the fraction of time samples.

Clause 51. A method according to clause 44, comprising not transmitting or receiving any data to be communicated with the other entity during the time period corresponding to the OFDM symbol.

Clause 52. A method according to clause 51, further comprising exchanging at least one message with the other entity comprising an indication of an OFDM symbol to be blanked and not transmitting or receiving any data comprises not transmitting or receiving any data during the OFDM symbol in accordance with the indication in said message.

Clause 53. A method according to any one of clauses 44 to 52, wherein the time grid defines a subframe and a plurality of OFDM symbol spacing times within the subframe, each symbol spacing time of the plurality of OFDM spacing times coinciding with a start time of an OFDM symbol of the plurality of OFDM symbols, wherein the time between two OFDM symbol spacing times is equal to the duration of an OFDM symbol or equal to an integer multiple of the duration of an OFDM symbol.

Clause 54. A method according to clause 53, wherein the time interval between two adjacent OFDM symbol spacing times is constant throughout the subframe.

Clause 55. Apparatus comprising means for implementing a method of any one of clauses 44 to 54.

Clause 56. Machine executable instructions arranged, when executed by one or more processors, to implement a method of any one of clauses 44 to 55.

Clause 57. Machine readable storage storing machine executable instructions according to clause 56.

Clause 58. A non-transient computer readable medium comprising machine executable instructions according to clause 56.

Clause 59. Apparatus for communicating in a wireless communication network using time division duplex (TDD) communication, comprising
- radio frequency (RF) circuitry to receive or transmit data in a plurality of time periods corresponding to orthogonal frequency demodulation (OFDM) symbols; and
- baseband circuitry to control the RF circuitry to switch from receive to transmit or from transmit to receive mode during time periods corresponding to fast sampled OFDM symbols in a hybrid sampling solution combining two or more sampling rates in a single subframe or in selected positions of a subframe block.

Clause 60. Apparatus according to clause 59, wherein the fast sampled OFDM symbols are within a subframe block and wherein the baseband circuitry is configured not to switch the RF circuitry during one or more subframes of the subframe block.

Clause 61. Apparatus for communicating in a wireless communication network comprising:
- transceiver circuitry to receive or transmit data in a plurality of time periods corresponding to orthogonal frequency demodulation OFDM symbols; and
- control circuitry configured to control the transceiver circuitry to ignore or suppress a fraction of time samples of an OFDM symbol while switching from receive mode to transmit mode or vice versa.

Clause 62. Apparatus according to clause 61, further comprising the control circuitry being configured to take measures to limit data reception or transmission degradation.

Clause 63. Apparatus for use in a wireless communication network, comprising:
- transceiver circuitry to receive and/or transmit data to another entity in the network; and
- control circuitry configured to control the transceiver circuitry to receive and/or transmit the data according to a time division duplex (TDD) time grid, wherein the time grid defines a subframe or subframe block comprising a plurality of time periods corresponding to data symbols for receiving or transmitting the data and defines a plurality of symbol spacing times within the subframe or subframe block, each symbol spacing time of the plurality of spacing times coinciding with a start time of a symbol of the plurality of symbols and wherein the time interval between two adjacent symbol spacing times is constant throughout the subframe or subframe block.

Clause 64. Apparatus according to clause 63, wherein control circuitry is configured to embed switching intervals within time periods corresponding to the symbols.

Clause 65. Apparatus according to clause 64, wherein the control circuitry is configured to control the apparatus to blank an OFDM symbol to provide a switching interval during a time period corresponding to the OFDM symbol.

Clause 66. A user equipment (UE) or base station comprising an apparatus according to any one of clauses 59 to 65.

Clause 67. A wireless communication network comprising a plurality of user equipments according to clause 39, 40, 41 or 66 and a plurality of base stations according to any one of clause 42, 43 or 66.

Clause 68. A time division duplex (TDD) time grid for communicating in a wireless communication network defining a subframe or subframe block comprising a plurality of time periods corresponding to data symbols for receiving or transmitting data according to an uplink and downlink allocation negotiated between two communicating entities, wherein the time grid defines a plurality of symbol spacing times within the subframe, each symbol spacing time of the plurality of spacing times coinciding with a start time of a symbol of the plurality of symbols and wherein the time interval between two adjacent symbol spacing times is constant throughout the subframe or subframe block.

Clause 69. A TDD time grid according to clause 68, comprising embedded switching intervals within one or more time periods corresponding to the data symbols.

Clause 70. An apparatus, user equipment (UE), vehicle terminal, method, base station substantially as described herein with reference to and/or as illustrated in any one or more of the drawings of FIGS. 1 to 4 and 6 to 18.

Example 1 may include a method of establishing a perfectly regular or LTE congruent, almost perfectly regular orthogonal frequency demodulation (OFDM) time grid comprising:
  Stealing/Ignoring any fraction (likely up to 10% but not limited to) of the time samples of an OFDM symbol while taking standardization-related or transparent or any combination of appropriate measures.

Example 2 may include the method of example 1 or some other example herein, wherein the appropriate measures include, on the transmit side, maximize the (remaining) spectral efficiency on the OFDM symbol.

Example 3 may include the method of example 1 or some other example herein, wherein the appropriate measures include optimize receiver-side processing, Example 4 may include the method of example 1 or some other example herein, wherein the appropriate measures include base station (BS) and user equipment (UE) that are aware of and "agree" on methods for example 2 or example 3.

Example 5 may include the method of example 1 or some other example herein, wherein the appropriate measures include UE receiver autonomously compromises the OFDM symbol with BS-transparent solutions for optimization of receiver-side processing.

Example 6 may include the method of example 1 or some other example herein, wherein the appropriate measures include BS receiver autonomously compromises the OFDM symbol with UE-transparent solutions for optimization of receiver-side processing.

Example 7 may include the method of any of examples 5 and 6 or some other example herein, wherein the amount of samples that are stolen or ignored may vary from device to device or from situation to situation and is transparent to the transmitter side.

Example 8 may include the method of example 5 or some other example herein, wherein there is a minimum performance requirement on the receiver side.

Example 9 may include a method of embedding time division duplex (TDD) switching intervals into the (almost) perfectly regular time grid comprising:
  blanking fast sampled orthogonal frequency demodulation (OFDM) symbols in a hybrid sampling solution combining two or more sampling rates in a single subframe or in selected positions of a Subframe Block (SFB).

Example 10 may include the method of example 9 or some other example herein, wherein the one sampling rate is approximately or exactly twice of the other sampling rate, e.g. 153.6 MHz (5*long term evolution (LTE) sampling) and 307.2 MHz sampling (10*LTE sampling).

Example 11 may include the method of example 1 or some other example herein, wherein the sampling rates include two or more sampling rates with arbitrary ratios.

Example 12 may include an almost perfect but long term evolution (LTE)-congruent time grid, i.e., the LTE subframe is an integer multiple of the fifth generation (5G) subframe and enables coexistence or interference management in all kinds of 5G and LTE heterogeneous use cases benefiting from synchronicity.

Example 13 may include a perfectly regular time grid, i.e., enabling 100% L1 channel assembly flexibility as well as coexistence and interference management within a synchronized fifth generation (5G) network, on the other hand, however, with a slowly progressing deviation from to the long term evolution (LTE) frame or subframe structure.

Example 14 may include a method of establishing a regular orthogonal frequency demodulation (OFDM) symbol spacing time grid, comprising:
  receiving, or causing to receive, a subframe; and
  ignoring, or causing to ignore, a fraction of time samples of an OFDM symbol within the subframe.

Example 15 may include the method of example 14 or some other example herein, wherein the ignoring of the fraction of time samples is performed independent of awareness by a transmitting device that transmits the subframe.

Example 16 may include the method of any of the examples 14 and 15 or some other example herein, wherein the method further comprises optimizing, or causing to optimize, processing of the subframe.

Example 17 may include the method of example 16 or some other example herein, wherein the optimization of the processing is performed independent of awareness by a transmitting device that transmits the subframe.

Example 18 may include the method of any of the examples 14-17 or some other example herein, wherein the fraction of time samples ignored is based, at least in part, on the device performing the method.

Example 19 may include the method of any of the examples 14-18 or some other example herein, wherein the fraction of time samples ignored is based, at least in part, on the situation.

Example 20 may include the method of any of the examples 14-19 or some other example herein, wherein the fraction of time samples ignored is a maximum of 10% of a total number of time samples of the OFDM symbol.

Example 21 may include the method of any of the examples 14-20 or some other example herein, wherein the method is performed by a user equipment (UE) and the transmitting device is a base station (BS).

Example 22 may include the method of any of the examples 14-20 or some other example herein, wherein the method is performed by a BS and the transmitting device is a UE.

Example 23 may include a method of generating a regular orthogonal frequency demodulation (OFDM) symbol spacing time grid, comprising:
  obtaining, or causing to obtain, a subframe to be transmitted to a remote device; and suppressing, or causing to suppress, a portion of time samples of a OFDM symbol within the subframe to be transmitted.

Example 24 may include the method of example 23 or some other example herein, wherein the method further comprises maximizing a spectral efficiency on the OFDM symbol.

Example 25 may include the method of any of the examples 23 and 24 or some other example herein, wherein the portion of time samples is a maximum of 10% of a number of time samples of the OFDM symbol.

Example 26 may include the method of any of the examples 23-25 or some other example herein, wherein the method is performed by a user equipment (UE) and the remote device is a base station (BS).

Example 27 may include the method of any of the examples 23-25 or some other example herein, wherein the method is performed by a BS and the remote device is a UE.

Example 28 may include the method of any of the examples 23-27 or some other example herein, wherein the method further comprises transmitting, or causing to transmit, the subframe to the remote device.

Example 29 may include a method for establishing a regular orthogonal frequency demodulation (OFDM) symbol spacing time grid embedded with at least one time division duplex (TDD) switching interval, comprising:
  identifying a subframe to be transmitted to a receiving device;
  identifying a blanked OFDM symbol within the subframe; and
  embedding the at least one TDD switching interval within the blanked OFDM symbol.

Example 30 may include the method of example 29 or some other example herein, wherein the method may further comprise:
  identifying a OFDM symbol within the subframe; and
  blanking the identified OFDM symbol to generate the blanked OFDM symbol.

Example 31 may include the method of any of the examples 29 and 30 or some other example herein, wherein the subframe is identified within a subframe block, and wherein other subframes within the subframe block do not include any TDD switching intervals.

Example 32 may include the method of any of the examples 29-31 or some other example herein, wherein the subframe includes two or more sampling rates.

Example 33 may include the method of example 32 or some other example herein, wherein the blanked OFDM symbol is identified from a group of OFDM symbols that have a first sampling rate of the two or more sampling rates, wherein the first sampling rate is a highest sampling rate within the two or more sampling rates.

Example 34 may include the method of example 32 or some other example herein, wherein the two or more sampling rates include a first sampling rate of 153.6 MHz and a second sampling rate of 230.4 MHz.

Example 35 may include the method of example 34 or some other example herein, wherein the blanked OFDM symbol is selected from a group of OFDM symbols that have the second sampling rate.

Example 36 may include the method of any of the examples 29-35 or some other example herein, wherein the method is performed by a base station (BS) and wherein the receiving device is a user equipment (UE).

Example 37 may include the method of any of the examples 29-35 or some other example herein, wherein the method is performed by a UE and wherein the receiving device is a BS.

Example 38 may include an apparatus that establishes a regular orthogonal frequency demodulation (OFDM) symbol spacing time grid, comprising:
  radio frequency (RF) circuitry; and
  baseband circuitry coupled with the RF circuitry, the baseband circuitry to:
    cause the RF circuitry to receive a subframe that includes at least one OFDM symbol;
    overlook a first portion of time samples of the at least one OFDM symbol; and
    perform appropriate measures with a second portion of the time samples that were not overlooked.

Example 39 may include the apparatus of example 38 or some other example herein, wherein the overlook of the first portion is performed independent of awareness by a transmission device that transmits the subframe.

Example 40 may include the apparatus of any of the examples 38 and 39 or some other example herein, wherein the appropriate measures includes optimization of processing of the subframe.

Example 41 may include the apparatus of example 40 or some other example herein, wherein the optimization of the processing is performed independent of awareness by a transmitting device that transmits the subframe.

Example 42 may include the apparatus of any of the examples 38-41 or some other example herein, wherein the first portion of the time samples is overlooked based, at least in part, on the device performing the method.

Example 43 may include the apparatus of any of the examples 38-42 or some other example herein, wherein the first portion of the time samples is overlooked based, at least in part, on a situation.

Example 44 may include the apparatus of any of the examples 38-43 or some other example herein, wherein the first portion of the time samples that is overlooked is a maximum of 10% of a total number of time samples of the OFDM symbol.

Example 45 may include the apparatus of any of the examples 39-44 or some other example herein, wherein the apparatus is a user equipment (UE) and the transmission device is a base station (BS).

Example 46 may include the apparatus of any of the examples 39-44 or some other example herein, wherein the apparatus is a BS and the transmission device is a UE.

Example 47 may include an apparatus for generation of a regular orthogonal frequency demodulation (OFDM) symbol spacing time grid, comprising:
  radio frequency (RF) circuitry; and
  baseband circuitry coupled with the RF circuitry, the baseband circuitry to:
    identify a subframe to be transmitted to a remote device;
    generate a new subframe from the subframe by suppression of a portion of time samples of an OFDM symbol within the subframe to be transmitted; and
    cause the RF circuitry to transmit the new subframe to the remote device.

Example 48 may include the apparatus of example 47 or some other example herein, wherein the baseband circuitry is further to maximize a spectral efficiency on the OFDM symbol.

Example 49 may include the apparatus of any of the examples 47 and 48 or some other example herein, wherein the portion of time samples is a maximum of 10% of a number of time samples of the OFDM symbol.

Example 50 may include the apparatus of any of the examples 47-49 or some other example herein, wherein the apparatus is a user equipment (UE) and the remote device is a base station (BS).

Example 51 may include the apparatus of any of the examples 47-49 or some other example herein, wherein the apparatus is a BS and the remote device is a UE.

Example 52 may include an apparatus for establishment of a regular orthogonal frequency demodulation (OFDM) symbol spacing time grid embedded with a time division duplex (TDD) switching interval, comprising:
 radio frequency (RF) circuitry; and
 baseband circuitry coupled with the RF circuitry, the baseband circuitry to:
  identify a subframe with a blanked OFDM symbol to be transmitted to a reception device; and
  embed within the blanked OFDM symbol the TDD switching interval.

Example 53 may include the apparatus of example 52 or some other example herein, wherein the baseband circuitry is further to blank an OFDM symbol within the subframe to generate the blanked OFDM symbol.

Example 54 may include the apparatus of any of the examples 52 and 53 or some other example herein, wherein the subframe is identified within a subframe block, and wherein other subframes within the subframe block do not include any TDD switching intervals.

Example 55 may include the apparatus of any of the examples 52-55 or some other example herein, wherein the subframe includes two or more sampling rates.

Example 56 may include the apparatus of example 55 or some other example herein, wherein the blanked OFDM symbol is identified from a group of OFDM symbols that have a first sampling rate of the two or more sampling rates, wherein the first sampling rate is a highest sampling rate within the two or more sampling rates.

Example 57 may include the apparatus of example 55 or some other example herein, wherein the two or more sampling rates include a first sampling rate of 153.6 MHz and a second sampling rate of 230.4 MHz.

Example 58 may include the apparatus of example 57 or some other example herein, wherein the blanked OFDM symbol is selected from a group of OFDM symbols that have the second sampling rate.

Example 59 may include the apparatus of any of the examples 52-58 or some other example herein, wherein the apparatus is a base station (BS) and wherein the reception device is a user equipment (UE).

Example 60 may include the apparatus of any of the examples 52-58 or some other example herein, wherein the apparatus is a UE and wherein the reception device is a BS.

Example 61 may include an apparatus comprising means to perform one or more elements of a method described in or related to any of examples 1-60, or any other method or process described herein.

Example 62 may include one or more non-transitory computer-readable media comprising instructions to cause an electronic device, upon execution of the instructions by one or more processors of the electronic device, to perform one or more elements of a method described in or related to any of examples 1-60, or any other method or process described herein.

Example 63 may include an apparatus comprising logic, modules, and/or circuitry to perform one or more elements of a method described in or related to any of examples 1-60, or any other method or process described herein.

Example 64 may include a method, technique, or process as described in or related to any of examples 1-60, or portions or parts thereof.

Example 65 may include an apparatus comprising: one or more processors and one or more computer readable media comprising instructions that, when executed by the one or more processors, cause the one or more processors to perform the method, techniques, or process as described in or related to any of examples 1-60, or portions thereof.

Example 66 may include a method of communicating in a wireless network as shown and described herein.

Example 67 may include a system for providing wireless communication as shown and described herein.

Example 68 may include a device for providing wireless communication as shown and described herein.

The invention claimed is:

1. Apparatus for use in a wireless communication network using a time division duplex (TDD) time grid, comprising:
 transceiver circuitry to send and receive data in a plurality of time periods, defined by the time grid, to another entity, the plurality of time periods corresponding to a plurality of orthogonal frequency division multiplexing (OFDM) symbols and the transceiver circuitry being operable to switch from receive mode to transmit mode and/or from transmit mode to receive mode according to a flexible uplink and downlink allocation of the plurality of time periods; and
 baseband circuitry coupled to the transceiver circuitry to control the transceiver circuitry to switch during a switching interval embedded within a time period corresponding to an OFDM symbol of the plurality of OFDM symbols
 wherein the apparatus and the entity have previously exchanged at least one message comprising an indication that the OFDM symbol of the of the plurality of OFDM symbols is to be blanked and the baseband circuitry is configured not to transmit or receive any data to be communicated with the other entity during the time period corresponding to the OFDM symbol in accordance with the indication in the message.

2. Apparatus according to claim 1, wherein the baseband circuitry is operable to operate at least two different sampling frequencies.

3. Apparatus according to claim 2, wherein the baseband circuitry is configured to operate at a faster sampling frequency of said at least two different sampling frequencies in at least a portion of a single subframe or a subframe block.

4. Apparatus according to claim 3, wherein the baseband circuitry is configured to control the transceiver circuitry to transmit or receive data in one or more fast OFDM symbols generated at a faster sampling frequency of the at least two different sampling frequencies.

5. Apparatus according to claim 4, wherein the baseband circuitry is configured to control the transceiver circuitry to switch during one or more other fast OFDM symbols generated at the faster sampling frequency.

6. Apparatus according to claim 1, wherein
 the baseband circuitry is configured to carry out measures to obtain all data transmitted by the other entity during the time period or limit a level to which the reception of the data transmitted by the other entity during the time period is compromised, and/or
 the baseband circuitry is configured to carry out measures to communicate all data scheduled for transmission during the time period or limit a level to which data scheduled for transmission during the time period is compromised.

7. Apparatus according to claim 1, wherein each of the plurality of OFDM symbols comprises a plurality of time samples and the switching interval corresponds to a fraction of said time samples.

8. Apparatus according to claim 7, wherein the fraction comprises less than 10% of the time samples.

9. Apparatus according to claim 7, wherein the baseband circuitry is arranged to control the transceiver circuitry to ignore data transmitted by the other entity during the switching interval independent of awareness by the other entity.

10. Apparatus according to claim 7, wherein the transceiver circuitry is operable to suppress a portion of data scheduled to be transmitted during the OFDM symbol.

11. Apparatus according to claim 1, wherein a position of the OFDM symbol is semi-dynamic and negotiable between the apparatus and the other entity.

12. Apparatus according to claim 1, wherein the time grid defines a subframe and a plurality of OFDM symbol spacing times within the subframe, each symbol spacing time of the plurality of OFDM spacing times corresponding to a start time of an OFDM symbol of the plurality of OFDM symbols, wherein the symbol spacing times are shared by electronic devices communicating in the wireless communication network.

13. Apparatus according to claim 12, wherein the time between two OFDM symbol spacing times is equal to the duration of an OFDM symbol or equal to an integer multiple of the duration of an OFDM symbol.

14. Apparatus according to claim 12, wherein the time interval between two adjacent OFDM symbol spacing times is constant throughout the subframe.

15. Apparatus according to claim 3, wherein the faster sampling frequency is approximately or exactly twice of another sampling frequency of the at least two different sampling frequencies.

16. A user equipment (UE) comprising the apparatus of claim 1.

17. A user equipment according to claim 16, further comprising one or more of:
a screen, a speaker, a keyboard, multiple antennas and/or a speaker.

18. Apparatus for communicating in a wireless communication network using a time division duplex (TDD) time grid, comprising:
means for identifying a subframe for receiving and/or transmitting data to another entity, the time grid defining a plurality of time periods within the subframe corresponding to a plurality of orthogonal frequency division multiplexing (OFDM) symbols;
means for determining the allocation of time periods of the plurality of time periods to uplink and/or downlink communication with the other entity;
means for identifying a time period of the plurality of time periods to embed a switching interval for switching from receive mode to transmit mode or from transmit mode to receive mode according to the allocation;
means for causing switching from receive mode to transmit mode or from transmit mode to receive mode during the switching interval; and
wherein the apparatus and the entity have previously exchanged at least one message comprising an indication that a OFDM symbol of the of the plurality of OFDM symbols is to be blanked and the baseband circuitry is configured not to transmit or receive any data to be communicated with the other entity during the time period corresponding to the OFDM symbol in accordance with the indication in the message.

19. Apparatus according to claim 18 further comprising means for using at least two different sampling frequencies to sample data received or to be transmitted in at least a portion of a single subframe or a subframe block.

20. Apparatus according to claim 18, wherein each of the plurality of OFDM symbols comprises a plurality of time samples and the switching interval corresponds to a fraction of said time samples.

* * * * *

UNITED STATES PATENT AND TRADEMARK OFFICE
CERTIFICATE OF CORRECTION

PATENT NO. : 11,165,495 B2  
APPLICATION NO. : 16/792147  
DATED : November 2, 2021  
INVENTOR(S) : Roessel et al.

Page 1 of 1

It is certified that error appears in the above-identified patent and that said Letters Patent is hereby corrected as shown below:

In the Claims

Column 36, Line 38, in Claim 1, delete "of the of the" and insert -- of the --; and Column 38, Line 26, in Claim 18, delete "of the of the" and insert -- of the --.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*